US012713494B2

(12) United States Patent
Esswie

(10) Patent No.: US 12,713,494 B2
(45) Date of Patent: Aug. 18, 2026

(54) DYNAMIC RECEPTION PROCEDURES FOR DEVICE ENERGY SAVING

(71) Applicant: Dell Products, L.P., Round Rock, TX (US)

(72) Inventor: Ali Esswie, Calgary (CA)

(73) Assignee: Dell Products L.P., Round Rock, TX (US)

(*) Notice: Subject to any disclaimer, the term of this patent is extended or adjusted under 35 U.S.C. 154(b) by 481 days.

(21) Appl. No.: 18/314,028

(22) Filed: May 8, 2023

(65) Prior Publication Data

US 2024/0381480 A1 Nov. 14, 2024

(51) Int. Cl.
*H04W 76/28* (2018.01)
*H04W 52/02* (2009.01)

(52) U.S. Cl.
CPC ....... *H04W 76/28* (2018.02); *H04W 52/0248* (2013.01)

(58) Field of Classification Search
CPC ............. H04W 76/28; H04W 52/0248; H04W 28/0236; H04W 28/0268; H04W 72/0446; H04W 72/23; H04W 52/0216
See application file for complete search history.

(56) References Cited

U.S. PATENT DOCUMENTS

| | | | | |
|---|---|---|---|---|
| 2016/0119969 A1* | 4/2016 | Vajapeyam | ........... | H04W 24/10 370/329 |
| 2020/0077428 A1* | 3/2020 | Zhou | ..................... | H04L 5/0023 |
| 2021/0298114 A1* | 9/2021 | Nam | ..................... | H04W 72/23 |
| 2023/0217276 A1* | 7/2023 | Chen | ..................... | H04W 24/10 370/252 |

(Continued)

FOREIGN PATENT DOCUMENTS

| | | | |
|---|---|---|---|
| WO | 2020/144354 | 7/2020 | |
| WO | WO-2024132455 A1 * | 6/2024 | ........ H04W 52/0216 |

OTHER PUBLICATIONS

A. Li et al, "Enhanced Power Saving Schemes for extended Reality" (Year: 2021).*

(Continued)

*Primary Examiner* — Andrew W Chriss

(74) *Attorney, Agent, or Firm* — Amin, Turocy & Watson, LLP

(57) ABSTRACT

A radio access network node may configure a user equipment with primary and secondary discontinuous reception occasion resource information. The node may transmit traffic to the user equipment that is received by the node at a regular/predictable rate during primary discontinuous reception ON periods. If the node receives traffic of a flow at an irregular or unpredictable rate, the node may transmit a secondary reception occasion indication to the user equipment indicative of secondary reception occasion resources usable by the user equipment during a configured primary discontinuous reception OFF period to receive the irregular or unpredictable traffic. The secondary reception occasion indication may comprise an index indicative of secondary discontinuous reception occasion resource information configured in the user equipment, which may maintain a receiver chain in an active state to receive the irregular or unpredictable traffic during an indicated secondary reception occasion ON period.

20 Claims, 14 Drawing Sheets

(56) References Cited

U.S. PATENT DOCUMENTS

2024/0114451 A1* 4/2024 He .................... H04W 52/0229

OTHER PUBLICATIONS

B. Paris et al, "Adaptive Discontinuous Reception in 5G Advanced for Extended Reality Applications" (Year: 2022).*

Ericsson (R2-2006333—Introduction of secondary DRX group CR 38.331) (Year: 2020).*

Technical specifications (TS) 38.201—"5G; NR; Physical layer; General description", 3GPP TS 38.201 version 15.0.0 Release 15, Sep. 2018, 14 pages.

Technical specifications (TS) 38.331—"5G; NR; Radio Resource Control (RRC); Protocol specification", 3GPP TS 38.331 version 16.1.0 Release 16, Jul. 2020, 886 pages.

Technical specifications (TS) 38.211—"5G; NR; Physical channels and modulation", 3GPP TS 38.211 version 16.2.0 Release 16, Jul. 2020, 136 pages.

Technical specifications (TS) 38.304—"5G; NR; User Equipment (UE) procedures in idle mode and in RRC Inactive state", 3GPP TS 38.304 version 16.1.0 Release 16, Jul. 2020, 41 pages.

Technical specifications (TS) 38.300—"5G; NR; NR and NG-RAN Overall description; Stage-2" 3GPP TS 38.300 version 16.4.0 Release 16, Jan. 2021, 151 pages.

International Search Report and Written Opinion mailed Feb. 26, 2024 for PCT Application No. PCT/US2023/036180, 18 pages.

Sorour Falahati et al: "Discussion on power saving enhancements for XR", Ericsson. 3GPP Draft; R1-2210922; vo1. 3GPP RAN 1, No. Toulouse, FR; Nov. 2022; [https://www.3gpp.org/ftp/TSG_RAN/WG1_R L1/TSGR1_111/Docs/RI-2210922• zip RI-2210922 Discussion on power saving enhancements for XR.doc], 26 pages.

Vivo: "Discussion on DRX Enhancements for XR Power Saving", 3GPP Draft; R2-2209488, vol. Ran WG2, No. Electronic; Oct. 2022; [https://ftp.3gpp.org/tsg_ran/WG2_RL2/T SGR2_119bis-e/Docs/R2-2209488.zip R2-2209488_Discussion on DRX enhancements for XR power saving vl.0.doc], 11 pages.

Notification Concerning Transmittal of International Preliminary Report on Patentability mailed Nov. 20, 2025 for PCT Application No. PCT/US2023/036180, 11 pages.

European Office Action mailed Dec. 16, 2025 for European Application No. 23813918.2, 3 pages.

* cited by examiner 100
110
115
116
117
118
105
120
125
135
137
140
145
CORE NETWORK 130
INTERNET SERVICES 150

400A

400B

Figure 6:
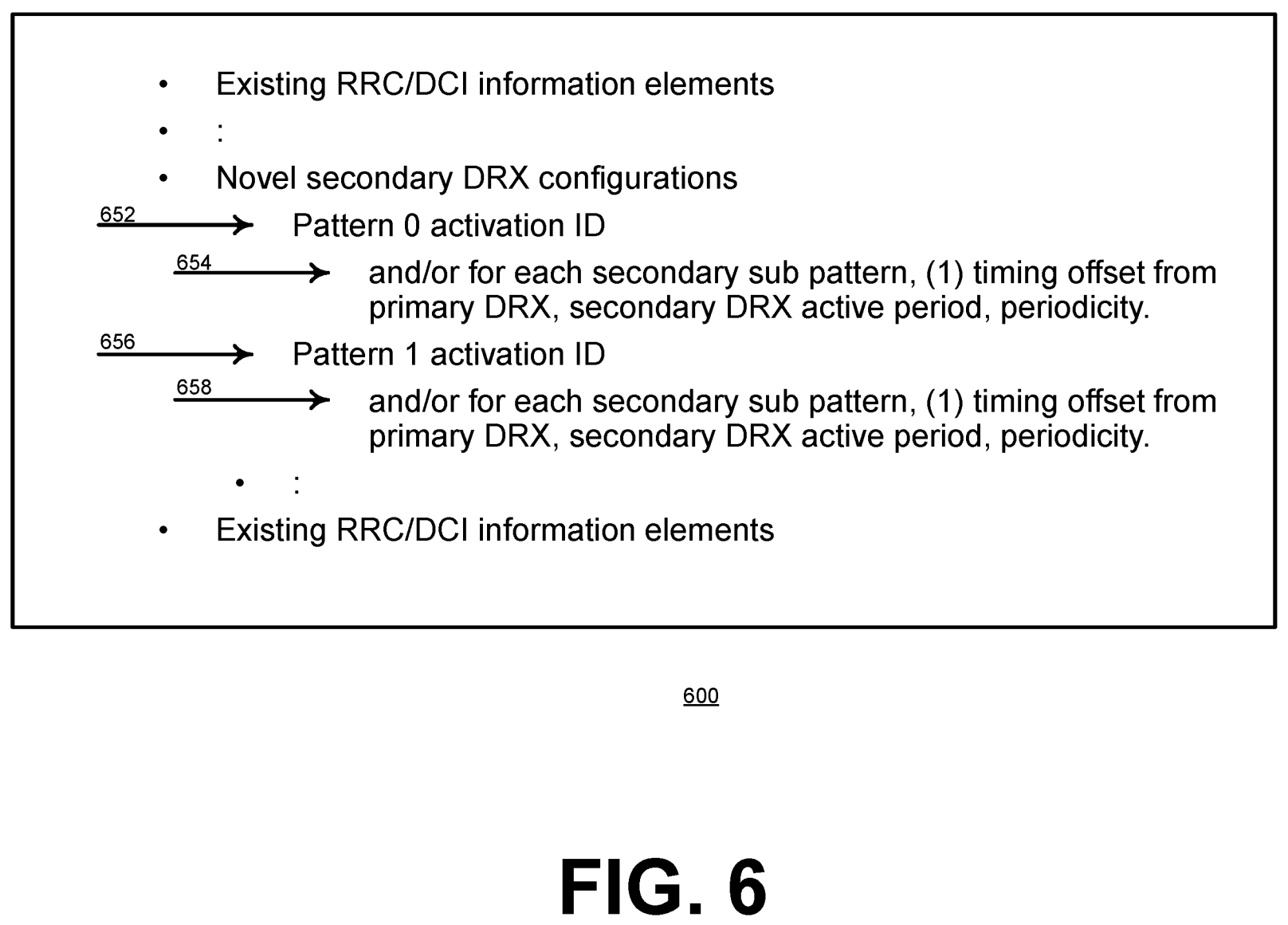

- Existing RRC/DCI information elements
- :
- Novel secondary DRX configurations 652 → Pattern 0 activation ID 654 → and/or for each secondary sub pattern, (1) timing offset from primary DRX, secondary DRX active period, periodicity.

656 → Pattern 1 activation ID

658 → and/or for each secondary sub pattern, (1) timing offset from primary DRX, secondary DRX active period, periodicity.

- :
- Existing RRC/DCI information elements

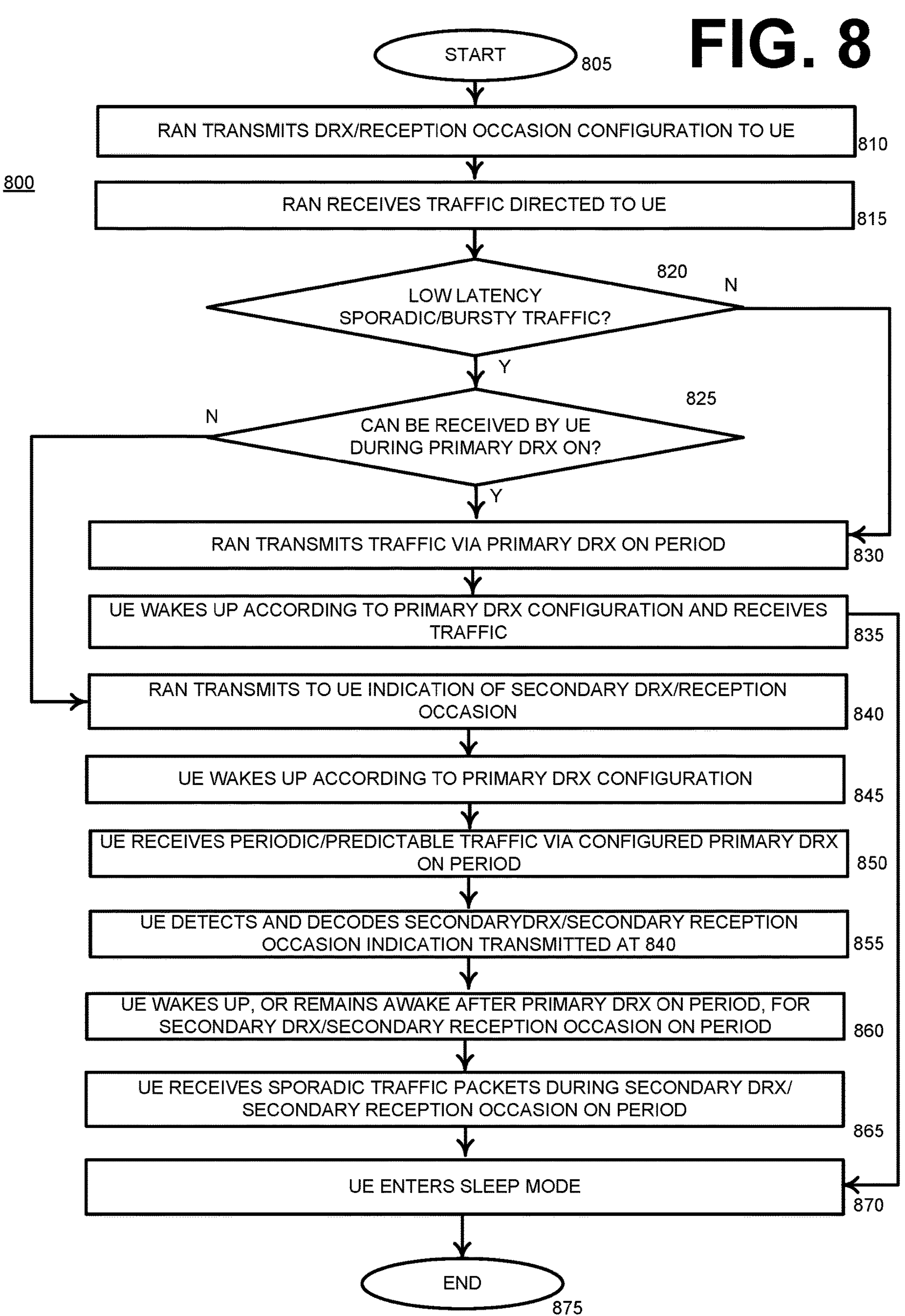
FIG. 8
800
START
805
RAN TRANSMITS DRX/RECEPTION OCCASION CONFIGURATION TO UE
810
RAN RECEIVES TRAFFIC DIRECTED TO UE
815
LOW LATENCY SPORADIC/BURSTY TRAFFIC?
820
N
Y
CAN BE RECEIVED BY UE DURING PRIMARY DRX ON?
825
N
Y
RAN TRANSMITS TRAFFIC VIA PRIMARY DRX ON PERIOD
830
UE WAKES UP ACCORDING TO PRIMARY DRX CONFIGURATION AND RECEIVES TRAFFIC
835
RAN TRANSMITS TO UE INDICATION OF SECONDARY DRX/RECEPTION OCCASION
840
UE WAKES UP ACCORDING TO PRIMARY DRX CONFIGURATION
845
UE RECEIVES PERIODIC/PREDICTABLE TRAFFIC VIA CONFIGURED PRIMARY DRX ON PERIOD
850
UE DETECTS AND DECODES SECONDARYDRX/SECONDARY RECEPTION OCCASION INDICATION TRANSMITTED AT 840
855
UE WAKES UP, OR REMAINS AWAKE AFTER PRIMARY DRX ON PERIOD, FOR SECONDARY DRX/SECONDARY RECEPTION OCCASION ON PERIOD
860
UE RECEIVES SPORADIC TRAFFIC PACKETS DURING SECONDARY DRX/ SECONDARY RECEPTION OCCASION ON PERIOD
865
UE ENTERS SLEEP MODE
870
END
875

FIG. 9

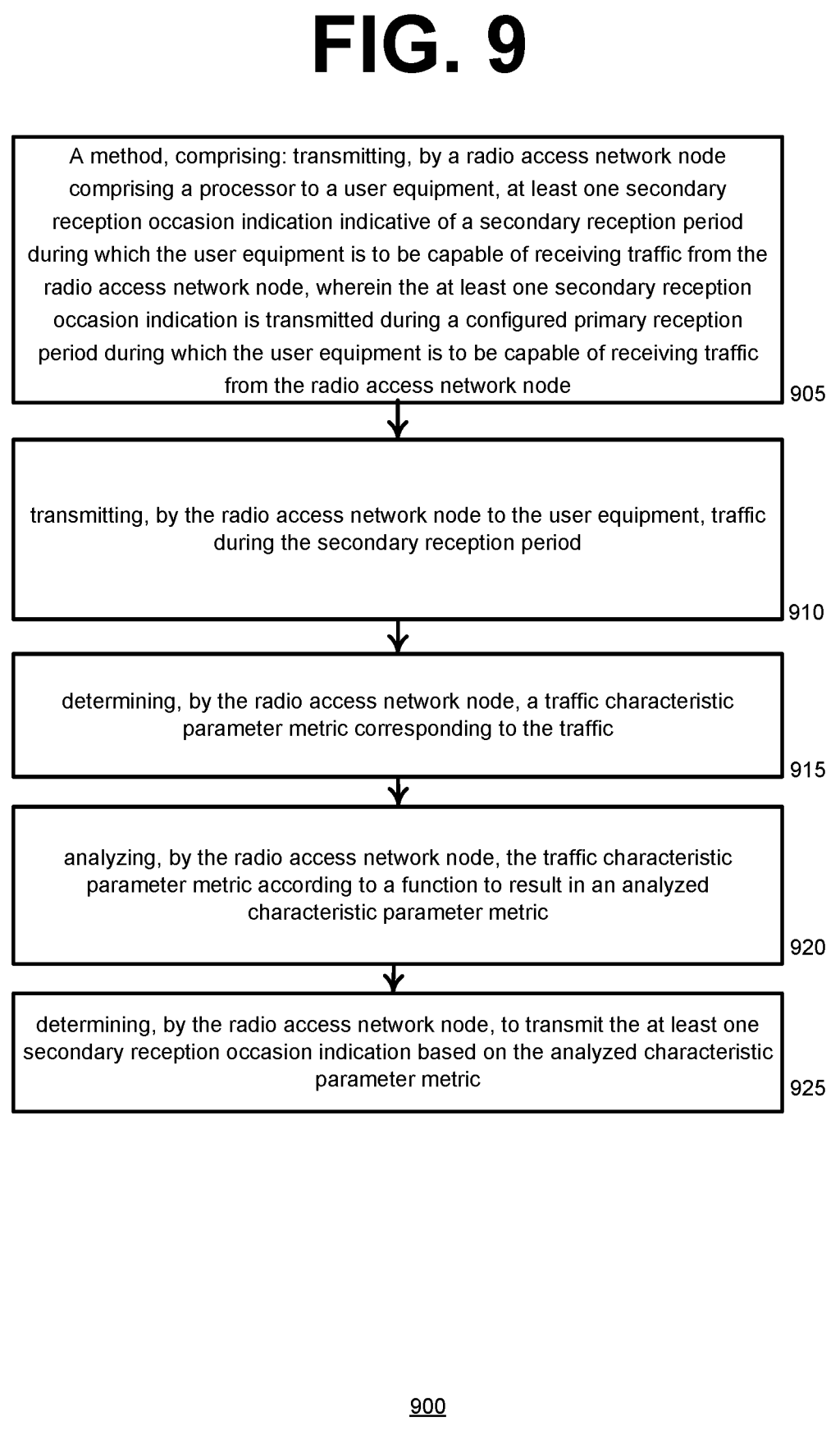

A method, comprising: transmitting, by a radio access network node comprising a processor to a user equipment, at least one secondary reception occasion indication indicative of a secondary reception period during which the user equipment is to be capable of receiving traffic from the radio access network node, wherein the at least one secondary reception occasion indication is transmitted during a configured primary reception period during which the user equipment is to be capable of receiving traffic from the radio access network node

905 transmitting, by the radio access network node to the user equipment, traffic during the secondary reception period

910 determining, by the radio access network node, a traffic characteristic parameter metric corresponding to the traffic

915 analyzing, by the radio access network node, the traffic characteristic parameter metric according to a function to result in an analyzed characteristic parameter metric

920 determining, by the radio access network node, to transmit the at least one secondary reception occasion indication based on the analyzed characteristic parameter metric

925

900

Figure 10:
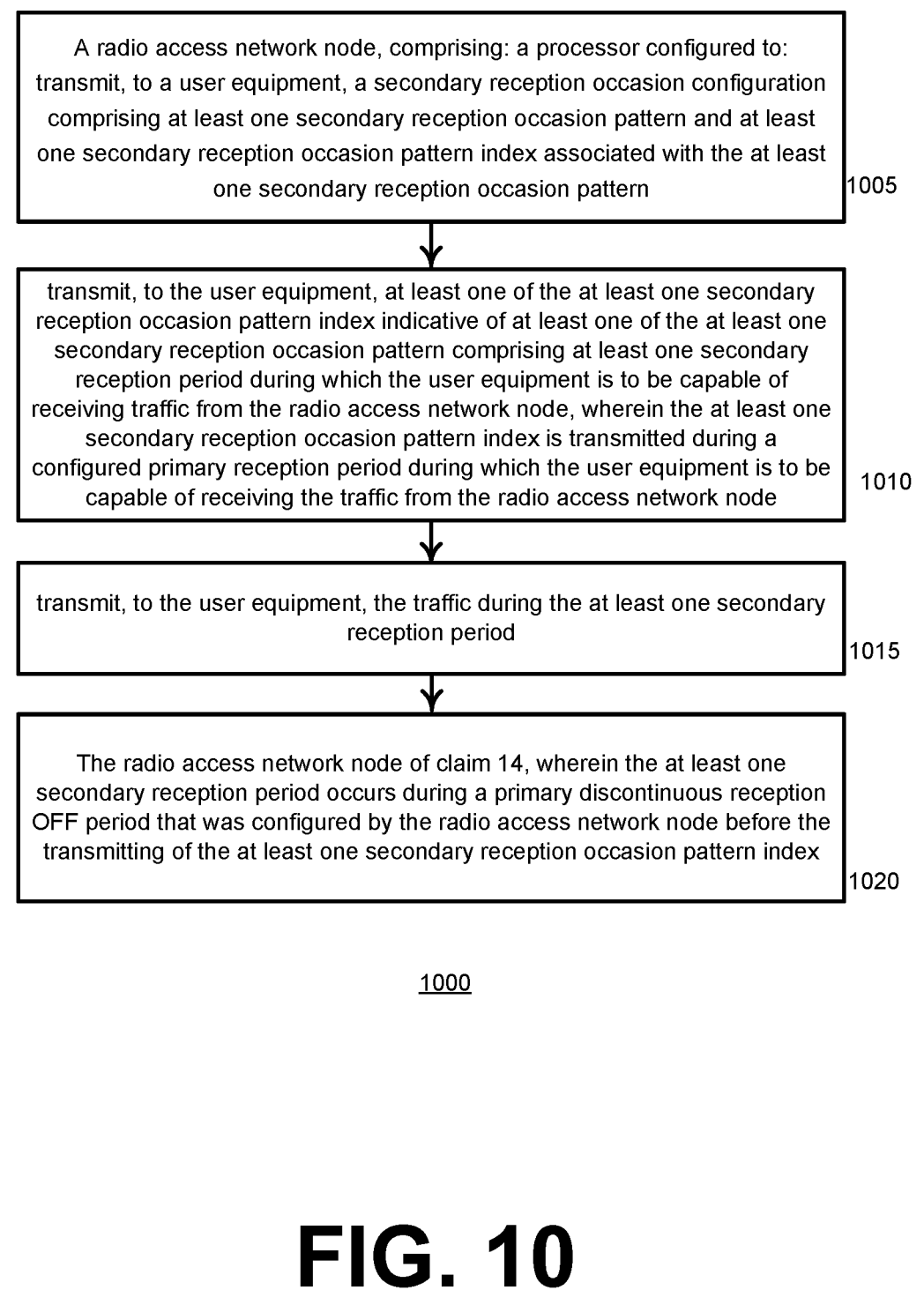

A radio access network node, comprising: a processor configured to: transmit, to a user equipment, a secondary reception occasion configuration comprising at least one secondary reception occasion pattern and at least one secondary reception occasion pattern index associated with the at least one secondary reception occasion pattern

1005 transmit, to the user equipment, at least one of the at least one secondary reception occasion pattern index indicative of at least one of the at least one secondary reception occasion pattern comprising at least one secondary reception period during which the user equipment is to be capable of receiving traffic from the radio access network node, wherein the at least one secondary reception occasion pattern index is transmitted during a configured primary reception period during which the user equipment is to be capable of receiving the traffic from the radio access network node

1010 transmit, to the user equipment, the traffic during the at least one secondary reception period

1015

The radio access network node of claim 14, wherein the at least one secondary reception period occurs during a primary discontinuous reception OFF period that was configured by the radio access network node before the transmitting of the at least one secondary reception occasion pattern index

DYNAMIC RECEPTION PROCEDURES FOR DEVICE ENERGY SAVING

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise transmitting, by a radio access network node comprising a processor to a user equipment, at least one secondary reception occasion indication indicative of a secondary reception period during which the user equipment is to be capable of receiving traffic from the radio access network node. The at least one secondary reception occasion indication is transmitted during a configured primary reception period during which the user equipment is to be capable of receiving traffic from the radio access network node. The method may further comprise transmitting, by the radio access network node to the user equipment, traffic during the secondary reception period. The configured primary reception period may be a primary discontinuous reception ON period configured by the radio access network node before the transmitting of the at least one secondary reception occasion indication. In an embodiment, the at least one secondary reception occasion indication may be transmitted as a control channel information message.

In an embodiment, the at least one secondary reception occasion indication is indicative of the secondary reception period occurring during a primary discontinuous reception OFF period corresponding to a primary discontinuous reception configuration that was configured by the radio access network node before the transmitting of the at least one secondary reception occasion indication.

In an embodiment, the at least one secondary reception occasion indication may be indicative to the user equipment that the user equipment is to revert to operation according to the primary discontinuous reception configuration after receiving the traffic transmitted during the secondary reception period.

The example method may further comprise determining, by the radio access network node, a traffic characteristic parameter metric corresponding to the traffic. The method may comprise analyzing, by the radio access network node, the traffic characteristic parameter metric according to a function to result in an analyzed characteristic parameter metric, and determining, by the radio access network node, to transmit the at least one secondary reception occasion indication based on the analyzed characteristic parameter metric. For example, if the characteristic parameter metric is a latency requirement and if waiting until a next primary DRX ON period to transmit the traffic would violate the latency requirement corresponding to the traffic, the node may determine to transmit the at least one secondary reception occasion indication to be indicative to the user equipment that the node has scheduled transmission of the traffic during the indication second reception occasion ON period. The traffic characteristic parameter metric corresponds to a traffic characteristic that comprises at least one of: a latency characteristic, a reliability characteristic, a periodicity characteristic.

The example method may further comprise transmitting, by the radio access network node to the user equipment, a secondary reception occasion configuration comprising a secondary reception occasion pattern and a secondary reception occasion pattern index associated with the secondary reception occasion pattern. The at least one secondary reception occasion indication may comprises the secondary reception occasion pattern index, which is to be indicative to the user equipment to operate according to the secondary reception occasion pattern. Thus, instead of transmitting to the user equipment actual timing and frequency resource information usable by the user equipment to receive traffic during the secondary reception occasion ON period, the node may transmit an index or an indication of one or more secondary reception occasion periods, or patterns, that may have been configured via the secondary reception inclusion configuration, to reduce the size of the at least one secondary reception occasion indication.

In an embodiment, the example method may further comprise transmitting, by the radio access network node to the user equipment, a secondary reception occasion configuration that comprises a first secondary reception occasion pattern associated with a first secondary reception occasion pattern index and comprising a second secondary reception occasion pattern associated with a second secondary reception occasion pattern index. The at least one secondary reception occasion indication may comprise at least one of the first secondary reception occasion pattern index or the second secondary reception occasion pattern index.

In an embodiment, the traffic may comprise a first traffic flow and a second traffic flow, for example two different traffic flows corresponding to one or more extended reality appliance(s). The secondary reception occasion configuration may further comprise a first secondary reception occasion criterion associated with the first secondary reception occasion pattern index and the secondary reception occasion configuration may further comprise a second secondary reception occasion criterion associated with the second secondary reception occasion pattern index. The example method may further comprise determining, by the radio access network node, a first traffic characteristic parameter metric corresponding to the first traffic flow and analyzing, by the radio access network node, the first traffic characteristic parameter metric according to a first function to result in an analyzed first traffic characteristic parameter metric. The example method may further comprise transmitting, by the radio access network node to the user equipment, the first secondary reception occasion pattern index based on the analyzed first traffic characteristic parameter metric satisfying the first secondary reception occasion criterion. The transmitting of the traffic during the secondary reception period may comprise transmitting traffic corresponding to the first traffic flow according to the first secondary reception occasion pattern.

The example method may further comprise determining, by the radio access network node, a second traffic characteristic parameter metric corresponding to the second traffic flow, analyzing, by the radio access network node, the second traffic characteristic parameter metric according to a second function to result in an analyzed second traffic characteristic parameter metric, transmitting, by the radio access network node to the user equipment, the second secondary reception occasion pattern index based on the analyzed second traffic characteristic parameter metric satisfying the second secondary reception occasion criterion. The transmitting of the traffic during the secondary reception period may comprise transmitting traffic corresponding to the second traffic flow according to the second secondary reception occasion pattern. Thus, the first traffic flow and the second traffic flow may both correspond to extended reality traffic, but the different flows may correspond to different traffic characteristic requirements, for example different latency requirements, and packets corresponding to the different flows may be transmitted according to different secondary reception occasion patterns. The first traffic flow and the second traffic flow may correspond to a first application associated with an extended reality appliance and a second application associated with the extended reality appliance, respectively.

In an embodiment, the secondary reception period is longer than a switching-on delay corresponding to the user equipment.

In another example embodiment, a radio access network node, may comprise a processor configured to transmit, to a user equipment, a secondary reception occasion configuration comprising at least one secondary reception occasion pattern and at least one secondary reception occasion pattern index associated with the at least one secondary reception occasion pattern. The processor may be further configured to transmit, to the user equipment, at least one of the at least one secondary reception occasion pattern index indicative of at least one of the at least one secondary reception occasion pattern comprising at least one secondary reception period during which the user equipment is to be capable of receiving traffic from the radio access network node. The at least one secondary reception occasion pattern index may be transmitted during a configured primary reception period during which the user equipment is to be capable of receiving the traffic from the radio access network node. The processor may be further configured to transmit, to the user equipment, the traffic during the at least one secondary reception period. The at least one secondary reception period may be configured to occur during a primary discontinuous reception OFF period that was configured by the radio access network node before the transmitting of the at least one secondary reception occasion pattern index.

In an embodiment, the traffic may comprise a first traffic flow and a second traffic flow. The at least one secondary reception occasion pattern may be a first secondary reception occasion pattern comprising a first of the at least one secondary reception period. The at least one secondary reception occasion pattern index may be a first secondary reception occasion pattern index and the secondary reception occasion configuration may further comprise a first secondary reception occasion criterion associated with the first secondary reception occasion pattern index. The secondary reception occasion configuration may further comprise a second of the at least one secondary reception occasion pattern index and a second of the at least one secondary reception occasion pattern that comprises a second of the at least one secondary reception period. The secondary reception occasion configuration may further comprise a second secondary reception occasion criterion associated with the second secondary reception occasion pattern index. The processor may be further configured to determine a first traffic characteristic parameter metric corresponding to the first traffic flow and determine a second traffic characteristic parameter metric corresponding to the second traffic flow. For example, the first and second traffic parameter metrics may comprise measured, detected, or determined latency values. The processor may be further configured to analyze the first traffic characteristic parameter metric according to a first function to result in an analyzed first traffic characteristic parameter metric (e.g., analyze the latency value corresponding to the first traffic with respect to a latency threshold or with respect to a traffic type to determine whether the first traffic can wait until a next primary DRX period to be transmitted to the user equipment or whether the first traffic should be transmitted sooner). The processor may be further configured to analyze the second traffic characteristic parameter metric according to a second function to result in an analyzed second traffic characteristic parameter metric. The processor may be further configured to determine to transmit the first of the at least one secondary reception occasion pattern index based on the analyzed first traffic characteristic parameter metric satisfying the first secondary reception occasion criterion or based on the analyzed second traffic characteristic parameter metric satisfying the first secondary reception occasion criterion. The transmitting of the traffic during the secondary reception period may comprise transmitting traffic, corresponding to the first traffic flow and corresponding to the second traffic flow, according to the first of the at least one secondary reception occasion pattern. In an embodiment, traffic corresponding to the first traffic flow may be transmitted during a first secondary reception occasion ON period and traffic corresponding to the second traffic flow may be transmitted during a second secondary reception occasion ON period, wherein both the first secondary reception occasion ON period and the second secondary reception ON period part of a secondary reception occasion pattern. In an embodiment, the first function and the second function may be the same, for example, both may comprise comparing a latency to a threshold.

In yet another embodiment, a non-transitory machine-readable medium, may comprise executable instructions that, when executed by a processor of a radio access network node, facilitate performance of operations, comprising transmitting, to a user equipment, a primary discontinuous reception configuration, comprising a primary discontinuous reception indication to be indicative to the user equipment of a primary discontinuous reception ON period during which the user equipment is to be capable of receiving traffic from the radio access network node and to be indicative of a primary discontinuous reception OFF period during which the user equipment is able to avoid receiving traffic from the radio access network node. The operations may further comprise transmitting, to the user equipment, a secondary discontinuous reception configuration comprising at least one secondary discontinuous reception pattern, wherein the at least one secondary discontinuous reception pattern comprises at least one secondary timing resource indication indicative of at least one secondary discontinuous reception ON period during which the user equipment is to be capable of receiving traffic from the radio access network node, wherein the at least one secondary discontinuous reception ON period is to occur during the primary discontinuous reception OFF period. The operations may further comprise transmitting, to the user equipment during the primary discontinuous reception ON period, at least one secondary discontinuous reception indication indicative of the at least one secondary discontinuous reception pattern and the operations may comprise transmitting, to the user equipment, the traffic during the at least one secondary discontinuous reception ON period.

In an embodiment, the traffic transmitted during the at least one secondary discontinuous reception ON period may comprise resource grant information indicative of at least one resource usable by the user equipment to receive data traffic during the at least one secondary discontinuous reception ON period. The operations may further comprise transmitting, to the user equipment, the data traffic according to the at least one resource.

BRIEF DESCRIPTION OF THE DRAWINGS

FIG. 6 illustrates an example discontinuous reception configuration comprising secondary reception period indications and corresponding resource information.

FIG. 8 illustrates a flow diagram of an example embodiment method of using one or more secondary reception occasions, configured to occur during one or more primary discontinuous reception period(s), to receive traffic.

FIG. 9 illustrates a block diagram of an example method embodiment.

FIG. 10 illustrates a block diagram of an example radio access network node.

FIG. 11 illustrates a block diagram of an example non-transitory machine-readable medium embodiment.

DETAILED DESCRIPTION OF THE DRAWINGS

Figure 1:
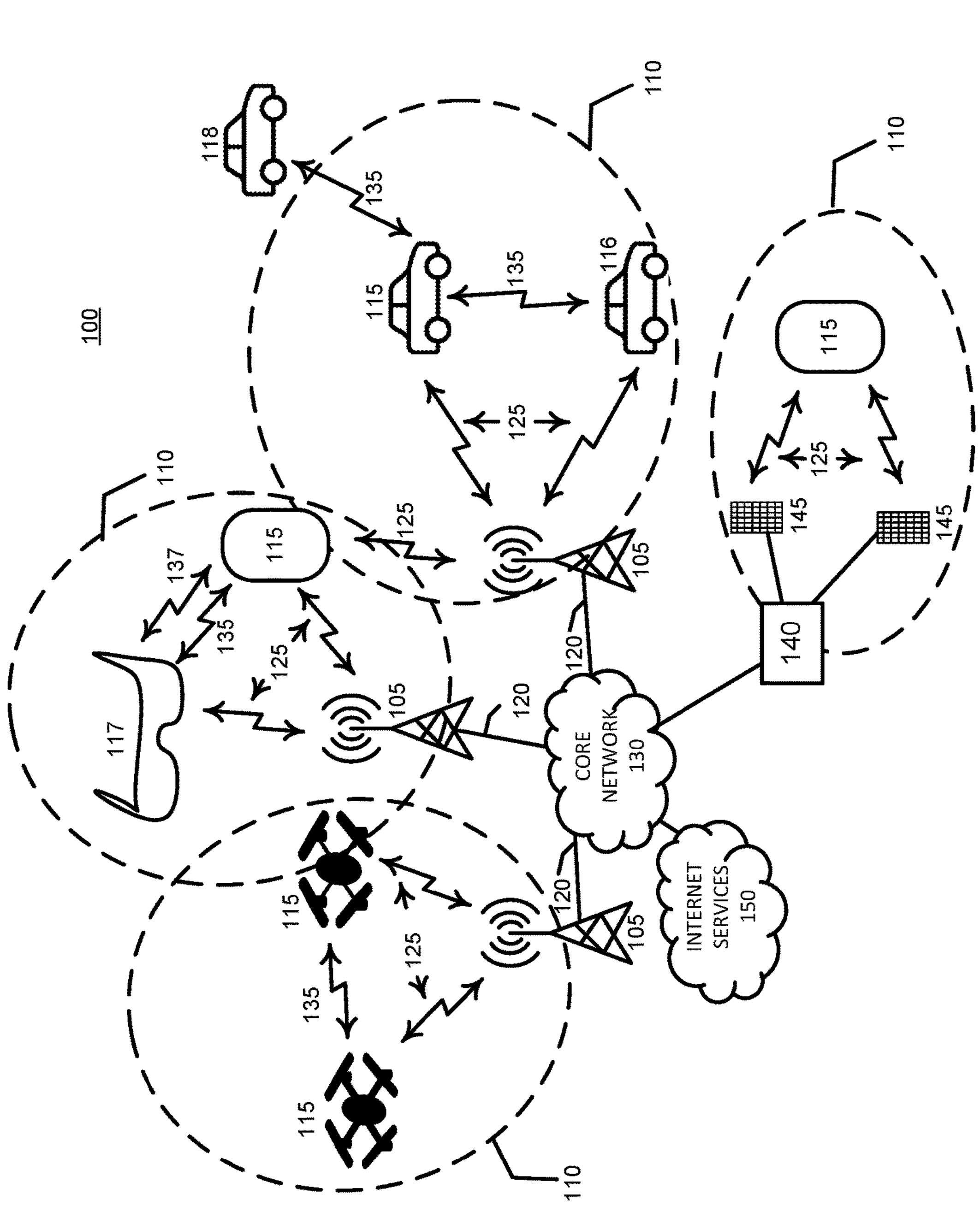
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

As an example use case that illustrates example embodiments disclosed herein, Virtual Reality ("VR") applications and VR variants, (e.g., mixed and augmented reality) may at some time perform best when using NR radio resources associated with URLLC while at other times lower performance levels may suffice. A virtual reality smart glass device may consume NR radio resources at a given broadband data rate having more stringent radio latency and reliability criteria to provide a satisfactory end-user experience.

5G systems should support 'anything reality' ("XR") services. XR services may comprise VR applications, which are widely adopted XR applications that provide an immersive environment which can stimulate the senses of an end user such that he, or she, may be 'tricked' into the feeling of being within a different environment than he, or she, is actually in. XR services may comprise Augmented Reality ('AR') applications that may enhance a real-world environment by providing additional virtual world elements via a user's senses that focus on real-world elements in the user's actual surrounding environment. XR services may comprise Mixed reality cases ("MR") applications that help merge, or bring together, virtual and real worlds such that an end-user of XR services interacts with elements of his, or her, real environment and virtual environment simultaneously.

Different XR use cases may be associated with certain radio performance targets. Common to XR cases, and unlike URLLC or eMBB, high-capacity links with stringent radio and reliability levels are typically needed for a satisfactory end user experience. For instance, compared to a 5 Mbps URLLC link with a 1 ms radio budget, some XR applications need 100 Mbps links with a couple of milliseconds of allowed radio latency. Thus, 5G radio design and associated procedures may be adapted to the new XR QoS class and associated performance targets.

An XR service may be facilitated by traffic having certain characteristics associated with the XR service. For example, XR traffic may typically be periodic with time-varying packet size and packet arrival rate, but may also be sporadic, or bursty, in nature. In addition, different packet traffic flows of a single XR communication session may affect an end user's experience differently. For instance, a smart glass that is streaming 180-degree high-resolution frames may use a large percentage of a broadband service's capacity for fulfilling user experience. However, frames that are to be presented to a user's pose direction (e.g., front direction) are the most vital for an end user's satisfactory user experience while frames to be presented to a user's periphery vision have less of an impact on a user's experience and thus may be associated with a lower QoS requirement for transport of traffic packets as compared to a QoS requirement for transporting the pose-direction traffic flow. Therefore, flow differentiation that prioritizes some flows, or some packets, of a XR session over other flows or packets may facilitate efficient use of a communication system's capacity to deliver the traffic. Furthermore, XR capable devices (e.g., smart glasses, projection wearables, etc.) may be more power-limited than conventional mobile handsets due to the limited form factor of the devices. Thus, techniques to maximize power saving operation at XR capable device is desirable. Accordingly, a user equipment device accessing XR services, or traffic flows of an XR session, may be associated with certain QoS metrics to satisfy performance targets of the XR service in terms of perceived data rate or end to end latency and reliability, for example.

High-capacity-demanding services, such as virtual reality applications, may present performance challenges to even 5G NR capabilities. Thus, even though 5G NR systems may facilitate and support higher performance capabilities, the radio interface should nevertheless be optimized to support extreme high capacity and low latency requirements of XR applications and XR data traffic while minimizing power consumption.

Turning now to the figures, FIG. 1 illustrates an example of a wireless communication system 100 that supports blind decoding of PDCCH candidates or search spaces in accordance with one or more example embodiments of the present disclosure. The wireless communication system 100 may include one or more base stations 105, one or more user equipment ("UE") devices 115, and core network 130. In some examples, the wireless communication system 100 may comprise a long-range wireless communication network, that comprises, for example, a Long-Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHZ)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs

115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one component carrier, or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communication system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
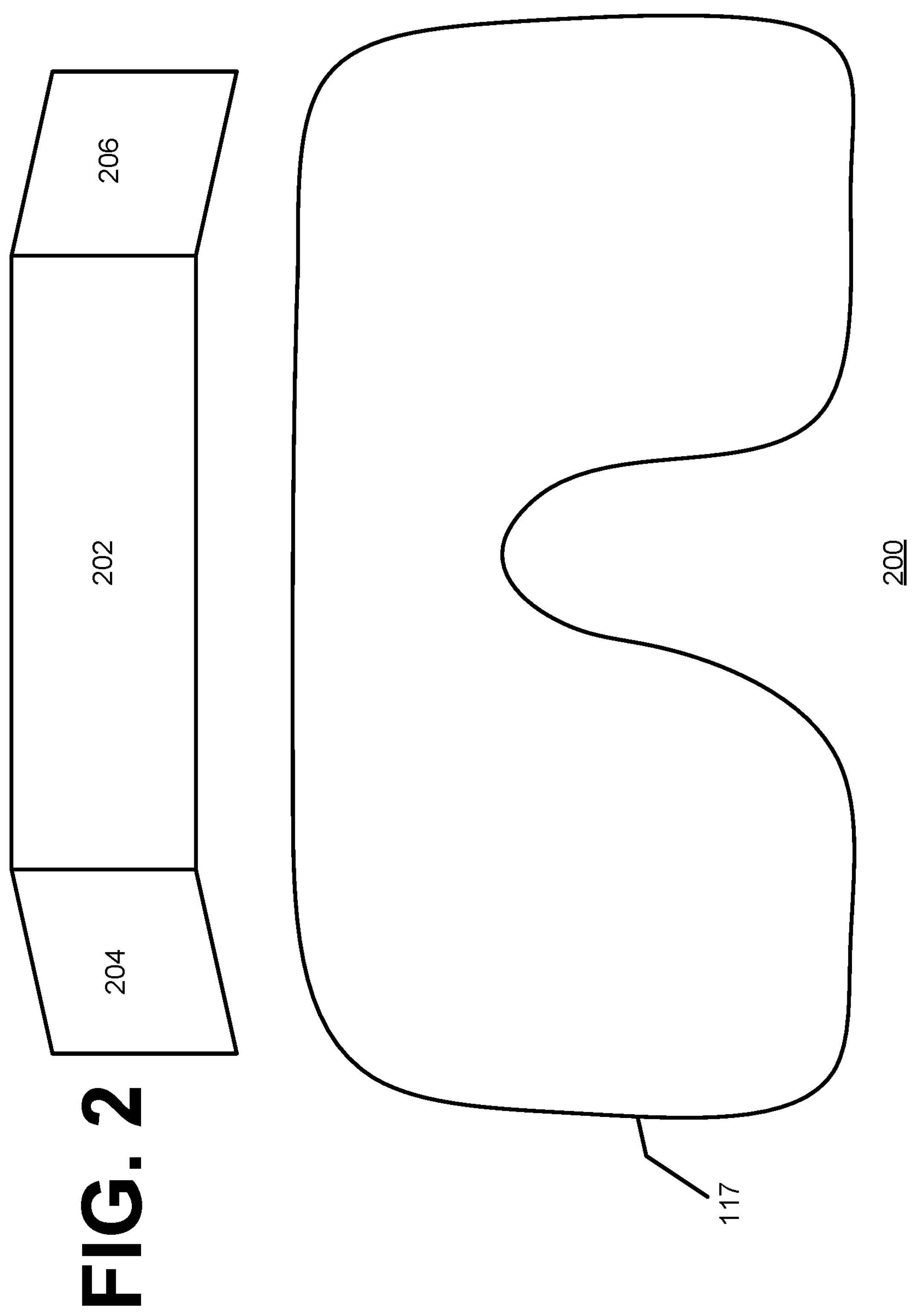
FIG. 2 illustrates an example virtual reality appliance.

Turning now to FIG. 2, the figure illustrates a virtual reality ("VR") application system 200. In system 200, wearable VR appliance 117 is shown from a wearer's, or viewer's, perspective. VR appliance 117 may comprise a center, or pose, visual display portion 202, a left visual display portion 204 and a right visual display portion 206, that may be used to display main visual information, left peripheral visual information, and right peripheral visual information, respectively. As shown in the figure, the portions 202, 204, and 206 are delineated by distinct lines, but it will be appreciated that hardware or software may facilitate gradual transition from main and peripheral information display.

As discussed above, different XR use cases may require different corresponding radio performance. Typically, for XR use cases but unlike for URLLC or eMBB use cases, high-capacity radio links that carry XR data traffic (e.g., data flows that comprise visual information) with stringent radio levels (e.g., latency) and reliability levels are required for a reasonable end user experience. For example, compared to a 5 Mbps URLLC link with a 1 ms radio latency budget, some XR applications require 100 Mbps links with about 2 mS allowed radio latency.

From research, several characteristics have been determined that for XR data traffic: (1) XR traffic characteristics are typically periodic with time-varying packet size and packet arrival rate; (2) XR capable devices may be more power-limited than conventional mobile handsets, (e.g., smart glasses, projection wearables, etc.) due to the limited form factor of the devices; (3) multiple data packet flows corresponding to different visual information of a given XR session are not perceived by a user as having the same impact on the end user experience.

Thus, in addition to needing XR-specific power use efficiency, smart glasses, such as wearable appliance 117, streaming 180-degree high-resolution frames requires broadband capacity for providing an optimum user experience. However, it has been determined that data corresponding to the frames that carry main, or center visual information (i.e., the pose or front direction) are the most vital for end user satisfaction, while the frames corresponding to peripheral visual information have a lesser impact on a user's experience. Therefore, accepting higher latency for less important traffic flows so that resources that would otherwise be allocated to the less important traffic flows can be used for traffic flows corresponding to more important traffic, or to devices that carry the more important traffic, may be used to optimize overall capacity and performance of a wireless communication system, such as a 5-G communication system using NR techniques, method, systems, or devices. For example, a wireless data traffic flow carrying visual information for display on center, or pose, visual display portion 202 may be prioritized higher than a wireless data traffic flow carrying visual information for left visual display portion 204 or for right visual display portion 206.

The performance of a communication network in providing an XR service may be at least partially determined according to satisfaction of a user of the XR services. Each XR-service-using user device may be associated with certain QoS metrics to satisfy the performance targets of the user's service, in terms of perceived data rate, end-to-end latency, and reliability.

A 5G NR radio system typically comprises a physical downlink control channel ("PDCCH"), which may be used to deliver downlink and uplink control information to cellular devices. The 5G control channel may facilitate operation according to requirements of URLLC and eMBB use cases and may facilitate an efficient coexistence between such different QoS classes.

Energy saving gains can be obtained at user equipment or radio access network nodes. Energy saving techniques may result in energy savings, but may also result in negative impact on radio signaling and functionality. Conventional techniques include multiple techniques for achieving energy saving. For example, to achieve an energy saving gain at user equipment devices, discontinuous reception ("DRX") procedures are a key optimization technique. Conventional DRX techniques may comprise user equipment not operating receivers continuously in a full power active state. Instead, according to conventional DRX techniques user equipment devices may be configured with periodic durations, where a user equipment activates receiver monitors a control channel indicating whether there is one or more incoming traffic packets or not. If not, user equipment devices may return back to an OFF state and shutting down their receivers, or transceivers. During an DRX OFF state or period, a user equipment may not perform any radio functions, e.g., the UE may not monitor control channels, receive reference signals, or receive or transmit traffic.

In order not to disrupt radio quality of service (QOS) requirements corresponding to user equipment while still enabling efficient DRX procedures for power saving, periodicity of a device DRX ON period may be configured to align temporally with expected, or statistically predicted, traffic packet arrivals. Thus, according to conventional techniques, traffic directed to a user equipment may be scheduled for transmission to the user equipment during a DRX ON period configured for the user equipment, which DRX ON period may be configured to coincide when traffic is most likely to arrive at a radio access network node, thus facilitating the RAN in minimizing traffic buffering latency while still facilitating energy-efficient DRX OFF periods.

However, for emerging services, such as extended reality (XR), traffic may comprise multiple traffic flows having different characteristics including various arrival rates, different periodicity, or packet/frame sizes. A conventional static DRX design having a fixed ON state duration and periodicity structure may be suboptimal and may lead to extended buffering delays of one or more of the multiple traffic flows having arrival times (e.g., arrival at a RAN) or periodicities that do not align with the conventional DRX ON periods. A conventional solution is to statically set the DRX ON periodicity to be aligned with the traffic arrivals of the most stringent traffic flow, (e.g., the fastest, or most frequent, traffic arrivals). However, increasing DRX ON period periodicity or regular duration may result in increased energy consumption at a user equipment due to the user equipment waking up more frequently. Such increase in energy consumption is especially inefficient and undesirable when there is no traffic to receive (e.g., a UE may wake up in case there is an incoming traffic packet to be received). Existing static DRX design techniques are not adaptive to the diverse traffic characteristics of multi traffic flow services and may result in a reduction in energy-saving benefit of DRX OFF periods.

Using embodiments disclosed herein a dynamic device DRX procedure may comprise dynamically scheduling DRX ON periods for a user equipment such that secondary DRX periods may be adapted to real-time conditions of traffic arrivals. For example, a DRX ON primary (e.g., conventional) periodicity may be configured for a user equipment that aligns temporally with an average, or a mean, expected traffic arrival rate. A user equipment may conventionally wake up and monitor configured control channel(s) during a configured primary DRX ON periods and a second one or more secondary DRX ON periods or period patterns can be further scheduled for traffic having a sporadic, or a low statistical predictability with respect to arrival at a RAN serving the UE. A configured, or indicated, secondary DRX ON period, which may be referred to a secondary reception occasion ON period, may be indicated when a radio access network node has not received, or does not expect to receive shortly (e.g., with adequate time remaining in a primary DRX ON period to transmit an arriving traffic packet) latency-critical traffic directed to a user equipment. Dynamically configuring/indicating to a user equipment to wake up more frequently for a certain period of time during a configured secondary reception occasion ON periods may facilitate a user equipment in receive incoming traffic without any, or as much, buffering delay that might otherwise be needed to wait for a next primary DRX ON period to transmit the received traffic. Not only may using a secondary reception occasion configured or indicated to occur during a primary DRX OFF period facilitate receiving latency-critical traffic with less buffering delay, but may also facilitate a user equipment less frequently waking up according to a more frequently scheduled primary DRX ON period when the RAN has no traffic to transmit to the UE since the configured/indicated secondary ON period or period pattern may be dynamically scheduled conditionally based on actual presence of traffic at the RAN serving the UE. Embodiments disclosed herein may comprise modifying a conventional downlink control information ("DCI") signal message to facilitating conveying secondary DRX ON period configuration and dynamic scheduling information to a user equipment. In embodiments disclosed herein, a user equipment may not necessarily operate according to a fixed DRX timeline, or schedule, for waking up and sleeping. Embodiments disclosed herein may facilitate a user equipment in receiving and operating according to secondary reception occasion period configurations dynamically scheduled instead of only operating according to statically scheduled primary DRX reception occasion periods that are not scheduled based on traffic arrivals at a RAN.

Discontinuous Transmission ("DTX") and Discontinuous Reception ("DRX")

DTX and DRX procedures may facilitate efficient energy saving gain at the RAN nodes and user equipment devices. DTX may refer to a transmitter, which may be a UE transmitter or a RAN node transmitter, transmitting radio signals including traffic, reference signals, or control information during certain periods of time, (e.g., periodic DTX ON periods) while the UE or RAN transmitter otherwise remains in DTX OFF. During a DTX OFF state, or DTX OFF period, most of, or all of, a transmitter's transmission radio chain may be shut down to achieve an energy saving gain. DRX may refer to a receiver being able to receive radio signals (traffic, control information and/or reference signals) during periodic DRX ON periods while otherwise being an OFF state during which radio circuits or functions may be off or idle. During a DRX OFF period a user equipment device may be considered as not effectively connected to a RAN network since the UE shuts down partially or fully its reception radio chain during a DRX OFF period.

DTX and DRX procedures may facilitate energy saving gains due to regular deactivation of either or both of receiver and transmitter chains. However, shutting down a transmitter or receiver chain may come at the expense of degraded radio performance, since during DTX OFF or DRX OFF periods transmitters or receivers are not available for radio operations. Thus, DRX OFF or DTX OFF periods may cause, or increase, traffic buffering delay. For example, when a packet is available at a RAN node for transmission towards a user equipment device, but the user equipment device is currently operating according to a configured DRX OFF period such that the user equipment's radio frequency receiver chain is not operational the user equipment cannot receive radio traffic payload. Accordingly, the RAN node transmitter may buffer such available traffic until the user equipment's DRX ON period begins when the UE becomes able to receive radio signals. A straightforward solution to minimize buffering delay due to primary DRX OFF period buffering is to set the periodicity of the user equipment's DRX ON period to be aligned in time with a periodicity, which may be a statistical average periodicity, corresponding to traffic packet arrivals that are directed to the user equipment. However, for multi-flow traffic, where different traffic flows have different respective packet arrival periodicities, existing single periodicity and static DRX cycle deigns may not efficiently support latency-critical traffic delivery.

Using conventional techniques, to avoid significantly increasing radio buffering latency, the periodicity of a DRX ON period corresponding to user equipment devices is typically set to be aligned in time with a statistical average periodicity of expected traffic arrivals for the user equipment device. Statistical, or expected, traffic packet arrival information may be obtained from an application or service being executed at the user equipment. Packets are not typically buffered for delay periods that would extend beyond the beginning of a new, or next scheduled, DRX ON corresponding to a user equipment. Aligning DRX ON periodicity with statistically predicted packet arrival times or rates may result in satisfactory (e.g., low) average buffering delay for single-flow traffic or for multi-flow traffic having a common traffic arrival periodicity for the flow, or flows.

However, for emerging services such as extended reality applications or services, traffic may be characterized by multiple independent flows with each being associated with different traffic flow characteristics. For example, a single XR traffic session may include traffic flows (for pose video streaming) which are consistent in time and require very stringent radio latency and reliability, whereas other flows, such as flows that may facilitate motion control or audio flows may sporadically arriving at a RAN node and may require a variety of radio performance targets to facilitate satisfactory performance targets.

Having the periodic DRX ON periods set to be aligned in time with an average overall traffic arrival periodicity with respect to multiple flows results in energy and latency inefficiency and degraded performance. This may be due to packet arrivals of some traffic flows having a much larger periodicity than traffic of other flows-a UE configured with periodic primary DRX ON periods that may satisfactorily accommodate a flow having a long traffic arrival periodicity (e.g., long period between DRX ON periods that align with similarly long traffic arrival at a RAN) may result in traffic buffering latency for packets of traffic flows having fast arrival rates (e.g., having short periodicities). Moreover, some traffic flows have traffic arrival characteristics that are sporadic in nature and that are not guaranteed/predictable or consistently available. For example, sudden XR motion control information is dependent on random/unpredictable human actions (e.g., orientation, standing, sitting, hitting, or other interactive gaming actions) rather than the XR traffic being generated by the XR service or application itself. Thus, user equipment devices waking up frequently according to a fixed, or static, schedule during configured primary DRX ON periods to monitor and check for traffic presence is highly energy inefficient when the sporadic traffic arrivals are not frequent. Having primary periodic DRX ON periods set to be aligned in time with the most stringent periodicity (e.g., fastest arrival rate or shortest periodicity between arrivals) of a traffic flow that belongs to a traffic session may facilitate low latency but is typically highly energy inefficient, especially with respect to sporadic/non-regular traffic packet arrivals. Embodiments disclosed herein may facilitate dynamic DRX period configuration to adaptively change a user equipment device waking up and shutting off to receive traffic based on real time arrival of traffic.

Dynamic Reception Procedures for Device Energy Saving

Using embodiment disclosed herein, user equipment devices may dynamically adapt fixed/static receiver timeline for primary DRX OFF periods according to dynamically receive secondary DRX ON period indications. Embodiments disclosed herein may facilitate a user equipment device being instructed, via an indication during a primary DRX ON period, to wake up during a secondary DRX ON period to receive traffic. The indication may comprise data resource information corresponding to the secondary DRX ON period. Instructing a user equipment to wake up during a secondary DRX ON period may be useful when a radio access network node has a determined amount of traffic available to transmit to the use equipment and thus schedules, during the indication during the primary DRX ON period, data resources usable during the secondary DRX ON period. Embodiments disclosed herein may facilitate instructing, during a primary DRX ON period, a user equipment to wake up during a secondary ON period to monitor another control channel, but not to receive traffic, during the secondary ON period to check whether traffic scheduling may be forthcoming. Monitoring a control channel during a secondary DRX ON period may be useful when a radio access network node serving the user equipment expects to have traffic soon for the user equipment but the traffic has not arrived during the primary DRX ON period. Embodiments disclosed herein may facilitate various user equipment devices, that may correspond to different models or different manufacturers, waking up with various delay offsets according to secondary DRX ON periods to monitor the control channel information during secondary DRX ON periods. A common, or standardized, minimum sleep-to-active switching delay offset may be determined for user equipment to facilitate a RAN node in identifying and selecting a secondary DRX pattern, suitable for capabilities of each of multiple user equipment devices to avoid violating a user equipment's switching delay that results from a user equipment switching from a receiver sleep state (e.g., and OFF state) to a receiver active state (e.g., an ON state).

Embodiments disclosed herein may use a first/baseline/primary DRX ON occasion set to configure user equipment devices to always periodically wake up and monitor control channels or receive periodic reference signals for radio channel estimation refining. Such primary DRX ON occasion set configurations may be used to schedule receiving of stable traffic arrivals at a RAN node where the traffic arrival periodicity is consistent, or to schedule receiving radio reference signals for continuously refining channel estimation accuracy. Moreover, according to embodiments disclosed herein, a transmitter/RAN node may dynamically schedule additional secondary DRX ON occasions sets or patterns (e.g., in addition to the configured primary DRX ON occasion resource set) for one or more certain secondary reception occasion activation/ON period(s) to occur during an already-configured primary DRX OFF period. During a configured secondary reception occasion active, or ON, period, a user equipment configured to operate according thereto may wake up according to the configured secondary reception occasion ON period, monitor control channels, or receive traffic via both a statically configured primary DRX ON occasion as well as via a dynamically configured secondary DRX ON occasion. Therefore, stable traffic arrivals or signals can be scheduled during primary DRX ON periods and sporadically-arriving traffic packets may be dynamically scheduled for transmission by a RAN node to a UE during a dynamically activated secondary DRX ON period.

A user equipment may first decode its control channel during a primary DRX ON period and determine whether the RAN node is dynamically configuring additional secondary DRX ON occasions or periods, based on one or more novel control channel indications transmitted via a device-specific control channel resource during a primary DRX ON occasion corresponding to the user equipment. In case of detecting the presence of a scheduling information indication indicative of one or more secondary DRX ON occasions, a user equipment may alter the user equipment's conventional DRX behavior by waking up, or staying awake, during the indicated secondary DRX ON period. A RAN node may trigger dynamic scheduling of a secondary DRX ON period when the node receives sporadic traffic packets that may be expected to arrive sporadically over a short time period in the future, (e.g., based on statistical information regarding traffic arrival randomness). Accordingly, a RAN node may dynamically schedule additional secondary DRX ON periods, or secondary reception occasions, for user equipment devices to accommodate the sporadically-arriving traffic packets. Embodiments disclosed herein may use novel control channel signaling messages, or novel control channel signaling information, for relaying to a user equipment available DRX ON secondary patterns or occasion structures, and for dynamically scheduling user equipment devices to use a configured secondary reception occasion ON period or pattern including a secondary reception occasion ON period. According to some embodiments, a user equipment may modify conventional DRX behavior by adopting a non-fixed-timeline for waking up and shutting off one or more receiver chains. Instead of waking up and shutting down a receiver chain according only to a configuration of static primary DRX ON periods, a user equipment may operate a receiver chain according to primary DRX ON occasions, but may override a configured primary DRX OFF period based on receiving a dynamic activation indication of a configured available secondary DRX ON pattern or occasion. Different secondary reception occasion periods may facilitate use of secondary reception occasion periods by user equipment of various types, models, or manufacturers that may have radio chain circuits or software/firmware that have correspondingly different delay times between shutting down a receiver chain and waking the receiver chain back up again (e.g., different delays may be due to different device hardware processing limitation). Accordingly, secondary DRX ON pattern designs may accommodate different minimum delay limitations of different devices. For example, a RAN node may avoid configuring, or indicating to, a user equipment a secondary DRX ON pattern that will result in the user equipment waking up and shutting off a receiver chain within a period of time that is less than a minimum amount of time that the user equipment needs for switching from a sleep state to an active state. Accordingly, secondary reception occasion patterns disclosed herein may be tailored to different user equipment to accommodate different delay limitations and to achieve smooth network-device interoperability.

Figure 3A:
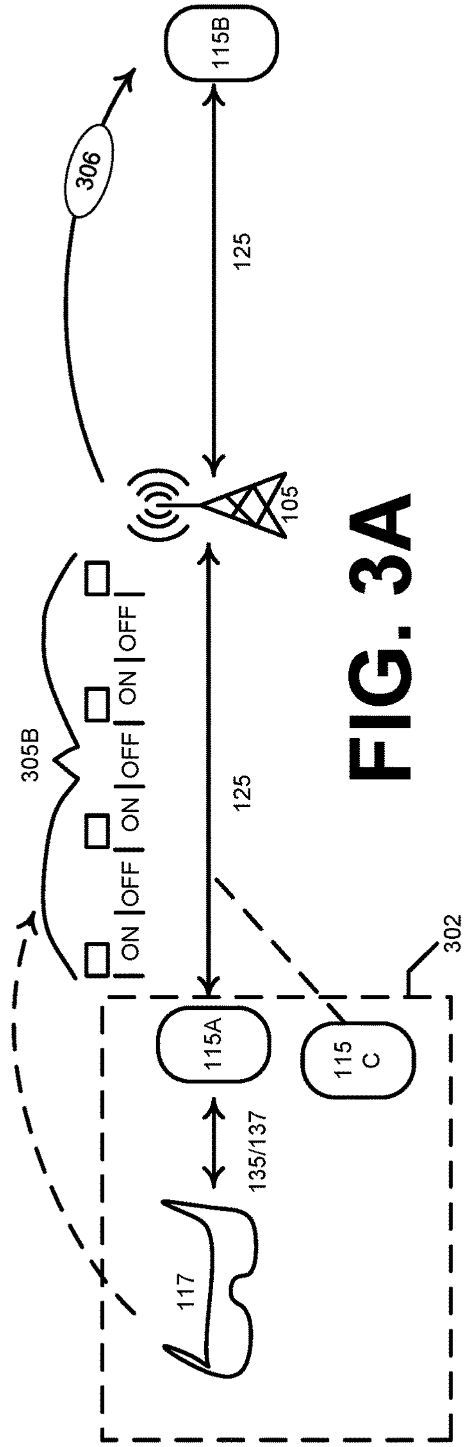
FIG. 3A illustrates an example environment with a first user equipment transmitting periodic traffic received from a user appliance to a radio access network node for further transmitting to a second user equipment.

Turning now to FIG. 3A, the figure illustrates an example environment 300 with first user equipment 115A transmitting periodic traffic 305A received from user appliance 117 to radio access network node 105 for transmission thereby to second user equipment 115B. It will be appreciated that appliance 117 and user equipment 115A may be separate devices or may be incorporated into a user device 302. In addition, a third user equipment 115C may also transmit traffic to radio access network node 105 to be transmitted thereby to user equipment 115B. User equipment 115C may be part of, or separate from, user device 302. For example, extended reality appliance 117 may comprise long range wireless modem circuitry to communicate with radio access network node 105. In another example, appliance 117 may be tethered to first user equipment 115A, which may transmit traffic received from the appliance to radio access network node 105. Radio access network node 105 may transmit to user equipment 115B a discontinuous reception configuration 306. Configuration 306 may be transmitted to user equipment 115B before traffic 305A is transmitted by user equipment 115A to radio access network node 105. As shown in FIG. 3A, traffic 305A is shown as being periodic in nature, having a period P. Accordingly, user equipment 115B many awaken according to a configured primary discontinuous reception cycle configured by configuration 306, which may configure equipment 115B to awaken periodically with, or in substantial synchronicity with, the periodicity P of traffic 305A. Thus, a general discontinuous reception configuration, which radio access network node 105 may have configured into one or more user equipment that are currently served by the radio access network node may provide satisfactory reception performance and power usage at user equipment 115A traffic that has a packet rate that is substantially periodic in nature.

Figure 3B:
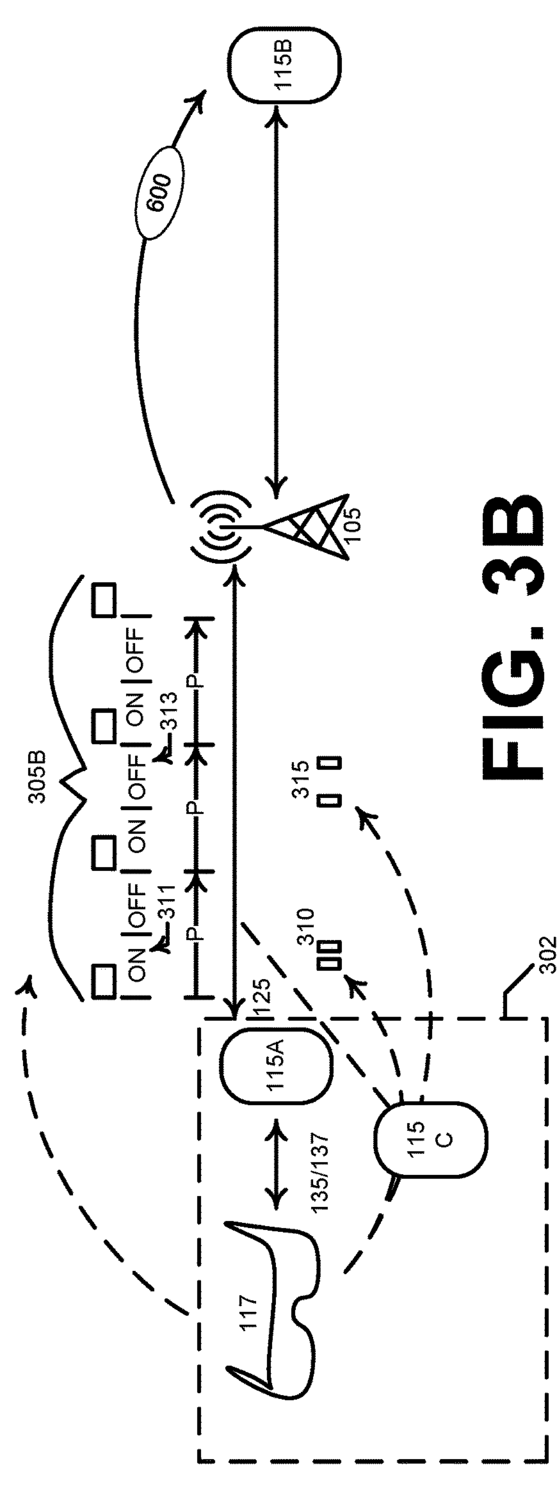
FIG. 3B illustrates an example environment with a first user equipment transmitting periodic traffic and sporadic/bursty traffic received from a user appliance to a radio access network node for further transmitting to a second user equipment.

As shown in FIG. 3B, traffic 310 or traffic 315 may be generated by appliance 117, for example due to a wearer of the appliance moving and thus generating traffic, that may not be periodic in nature, or at least that may not share the same period P as traffic 305B. In an example, traffic 310 or traffic 315 may be generated by a different portion of appliance 117 than generates traffic 305B. Thus, traffic 305 may correspond to a first traffic flow and traffic 310 or traffic 315 may correspond to a second traffic flow. In an embodiment traffic 305, traffic 310, or traffic 315, may be generated by one of, or more than one of, appliance 117, user equipment 115A, or user equipment 115C. Traffic 310 may be received by radio access network node 105 near the end of primary discontinuous reception ON period 311, or traffic 315 may be received during primary discontinuous reception OFF period 313. In either case, radio access network node 105 may need to buffer packets corresponding to traffic 310 or 315 if only primary discontinuous reception ON and OFF period cycles are configured by configuration 306 shown in FIG. 3A.

However, secondary discontinuous reception ON periods may be configured by secondary reception occasion configuration 600, which may, or may not, comprise primary discontinuous reception configuration cycle configuration information. Information contained within secondary reception occasion configuration 600 is described in more detail in reference to FIG. 6.

Figure 4A:
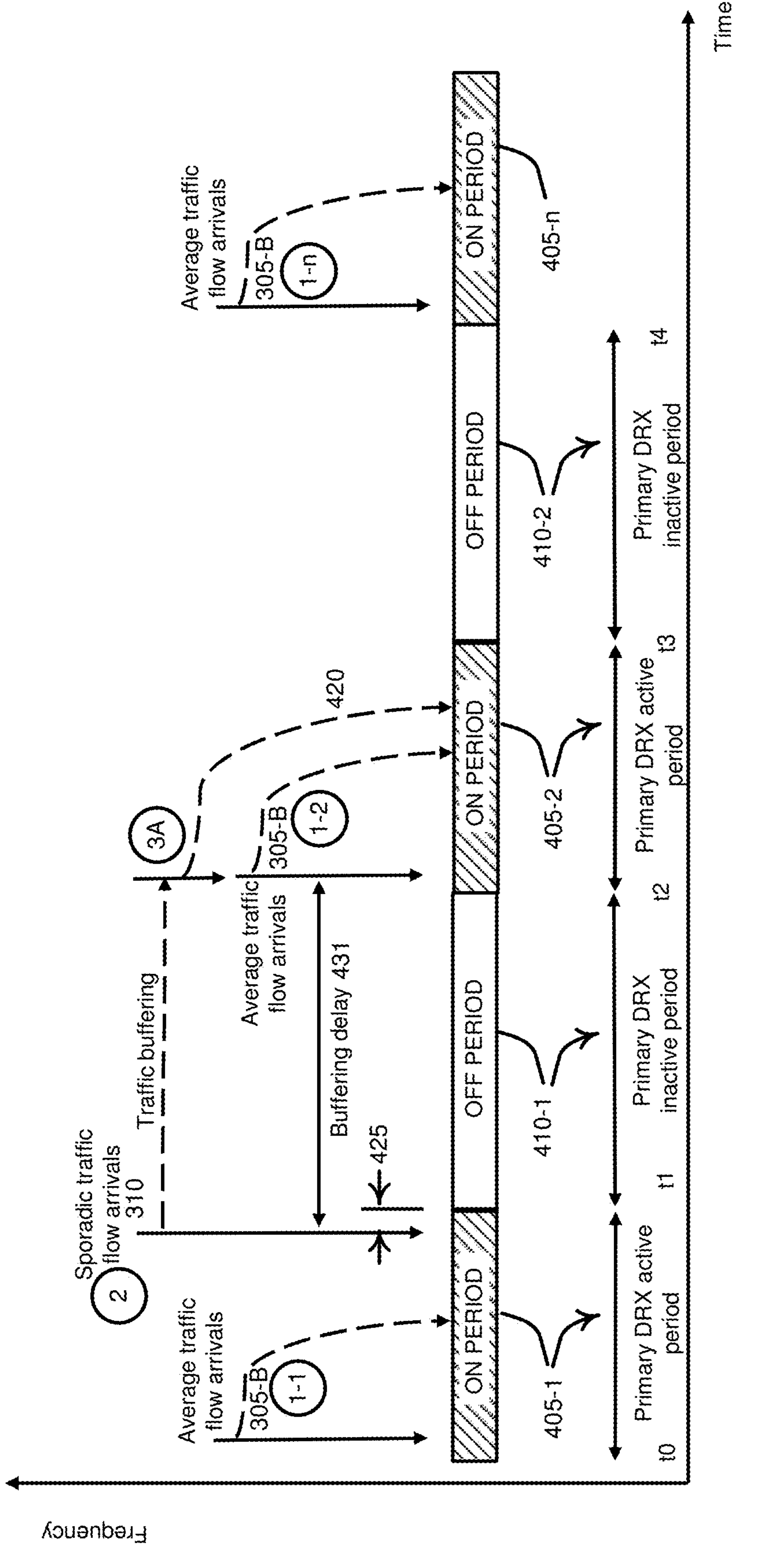
FIG. 4A illustrates a resource diagram of primary discontinuous reception ON and OFF periods configured in a user equipment to which periodic and sporadic traffic is directed.

A discontinuous reception procedure shown in FIG. 4A may configure a user equipment with conventional primary discontinuous reception ON and OFF period cycles, such as may be configured by configuration 306 described in reference to FIG. 3A. As shown in FIG. 4A, a user equipment may be configured to operate according to a primary DRX cycle comprising DRX ON periods 405. During ON periods 405, a user equipment may wake up and monitor control channel(s) information specific to the user equipment. The control channel information may indicate whether a RAN has traffic to be transmitted to the user equipment or not. If traffic payload directed to the user equipment has arrived at the RAN, the RAN, during an inactive period 410 (e.g., during a configured sleep mode or DRX OFF period) corresponding to the user equipment, may buffer the available traffic payload to be transmitted to the user equipment until a next configured DRX ON period 405 corresponding to the device, during which the user equipment becomes able to monitor control channel information specific to the user equipment and extract from the control channel information scheduling information usable to receive the traffic from the RAN.

As an example, traffic 310 described in reference to FIG. 3B may be received by a radio access network node near the end of DRX ON period 311, which may correspond to period 405-1 shown in resource diagram 400A in FIG. 4A. Even though the traffic is received during DRX ON period 311, only a small amount of time 425 shown in FIG. 4A may remain in the DRX ON period that may not facilitate transmission and reception of traffic 310 before the user equipment is configured to enter a sleep mode according to a primary discontinuous reception configuration, such as configuration 306 described in reference to FIG. 3A. Thus, a configured primary discontinuous reception cycle may facilitate receiving periodic traffic 415 transmitted at act 1-1 shown in FIG. 4A that may be periodic in nature or that may have an average, or mean, periodicity that is adequately supported by the configured primary discontinuous reception ON/OFF cycle.

However, a radio access network node that has received sporadic traffic 420 at act 2 may buffer the sporadic traffic instead of transmitting the traffic near the end of primary discontinuous reception ON period 405-1, resulting in buffering delay 431. The radio access network node may buffer traffic 420 and transmit the buffered traffic at act 3A at the beginning of configured primary discontinuous reception ON period 405-2, during which the radio access network node may also transmit newly received packets of periodic traffic 415 receive at act 1-2. The user equipment may enter sleep mode again during discontinuous reception OFF period 410-2, and awaken again to receive packets of periodic traffic 415 again at future configured discontinuous reception ON periods 405-*n* at acts 1-*n*. Accordingly, widening the length of configured primary DRX OFF periods 410 may result in battery/energy saving gain at a user equipment, but at the expense of potentially increasing the length of packet buffering delays, such as buffering delay 431, which buffering delay length may not satisfy a desired latency criterion corresponding to a traffic flow, the packets of which are buffered during the buffering delay.

Figure 4B:
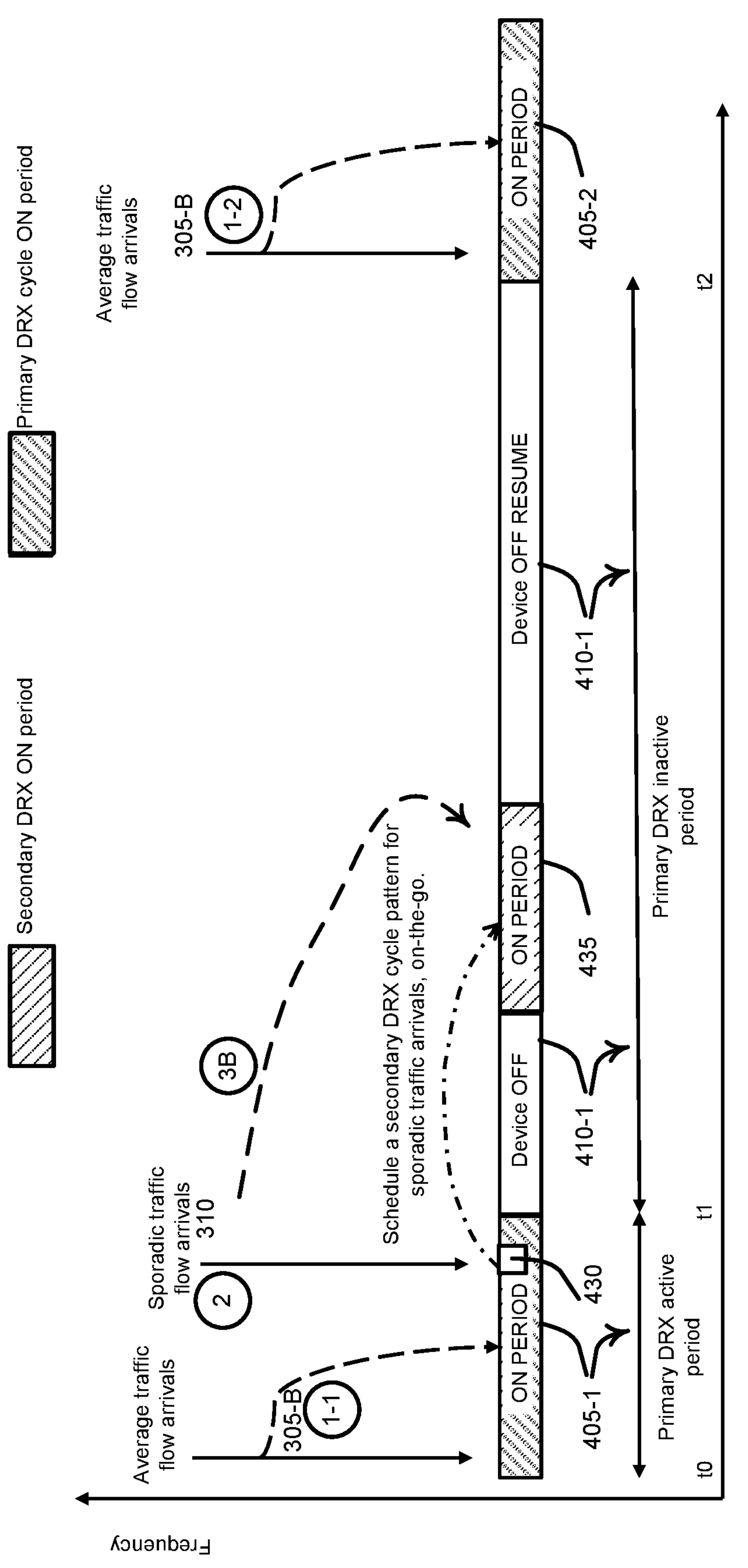
FIG. 4B illustrates a resource diagram of a secondary discontinuous reception period, during a primary discontinuous reception OFF period, usable by a user equipment to sporadic traffic.

Turning now to FIG. 4B, a novel dynamic DRX-setting resource diagram is shown. A primary DRX ON periodicity and respective resource set are configured. The primary DRX ON period may be used for transmitting stable/periodic traffic flow packets having a consistent arrival periodicity, or at least a consistent average or mean periodicity. However, a user equipment may be configured with secondary discontinuous reception ON periods via, for example, configuration 600 described in reference to FIG. 3B and FIG. 6. Continuing with description of FIG. 4B, a RAN node may transmit to a user equipment via a device-specific control channel during a primary DRX ON period, such as period 405-1, a downlink control indication 430 towards a user equipment to which sporadically received traffic 310 (as described in reference to FIG. 3B) corresponds. The user equipment receiving indication 430 may look up in configuration information contained in configuration 600 secondary discontinuous reception configuration information associated with a pattern indication contained in indication 430. A secondary DRX ON occasions may be configured via a pattern indicated by an indication contained in indication message 430 to occur during a scheduled primary DRX OFF period (e.g., secondary DRX ON period 435 is shown in FIG. 4B being active during configured primary DRX OFF period 410-1). A secondary DRX ON period pattern indicated by an indication message 430 may comprise a secondary DRX ON period occurring as one or more extensions of a certain number of future primary DRX ON periods. A secondary DRX ON occasion configuration, such as configuration 600, may comprise timing information corresponding to secondary DRX ON period. A secondary reception occasion indication message 430 may comprise timing resource information corresponding to a secondary DRX ON pattern. A secondary reception occasion indication message 430 may comprise an indication in the form of an index or identifier corresponding to a selected secondary DRX ON pattern, which a user equipment may use to look up in a configured, hard-coded list (e.g., the user equipment may used an index indicated in indication message 430 to retrieve secondary reception occasion information in configuration information received in configuration 600), or set, of available secondary DRX ON patterns. A secondary DRX pattern may comprise resource definitions corresponding to one or more secondary DRX ON occasions within a determined period, having defined periodicity and active curations corresponding to each DRX ON period defined by the pattern.

From the perspective of a user equipment, during a primary DRX ON period corresponding to the user equipment, the user equipment may monitor and blindly decode a configured control channel and determine from information extracted therefrom whether the control channel information comprises a dynamic scheduling information message, such as message 430, indicative of one or more secondary DRX ON periods. If so, the user equipment may adjust an awaken timeline, or schedule, to accommodate the configured secondary cycles of wake mode and sleep mode based on the dynamically configured secondary DRX ON information.

From the RAN node's perspective, when additional packet arrivals start arriving at the node's receiver chain and start to become available for transmission towards a device that is currently awake during an active primary DRX ON period, the RAN node may dynamically activate additional one or more secondary DRX ON occasions and/or patterns for the user equipment to monitor for further traffic scheduling information or traffic transmission. Conventionally, a RAN node may transmit scheduling information corresponding to the latest received and buffered traffic (the user equipment is awake during the primary DRX ON period and can receive control channel information traffic), the amount of which the RAN node may not be fully aware since the data traffic may have just started arriving. During the primary DRX on period, conventionally, the RAN node may transmit to the user equipment multiple scheduling grants granting resources usable during the current and next primary DRX ON periods to receive the traffic.

Instead, using embodiments disclosed herein, a RAN node may activate a certain secondary DRX ON occasion, usable by the user equipment, while the node is still receiving incoming sporadic traffic arrivals directed to the user equipment. Accordingly, when the first available configured activated secondary DRX ON occasion starts, the RAN node may transmit the traffic scheduling information indicative of a received traffic volume that has been received by the RAN. Thus, a benefit of embodiments disclosed herein is that a RAN node may avoid transmitting multiple resource grants for a small amount of received traffic while avoiding buffering sporadically received payload for extended delays until a next available primary DRX ON occasion.

Figure 5:
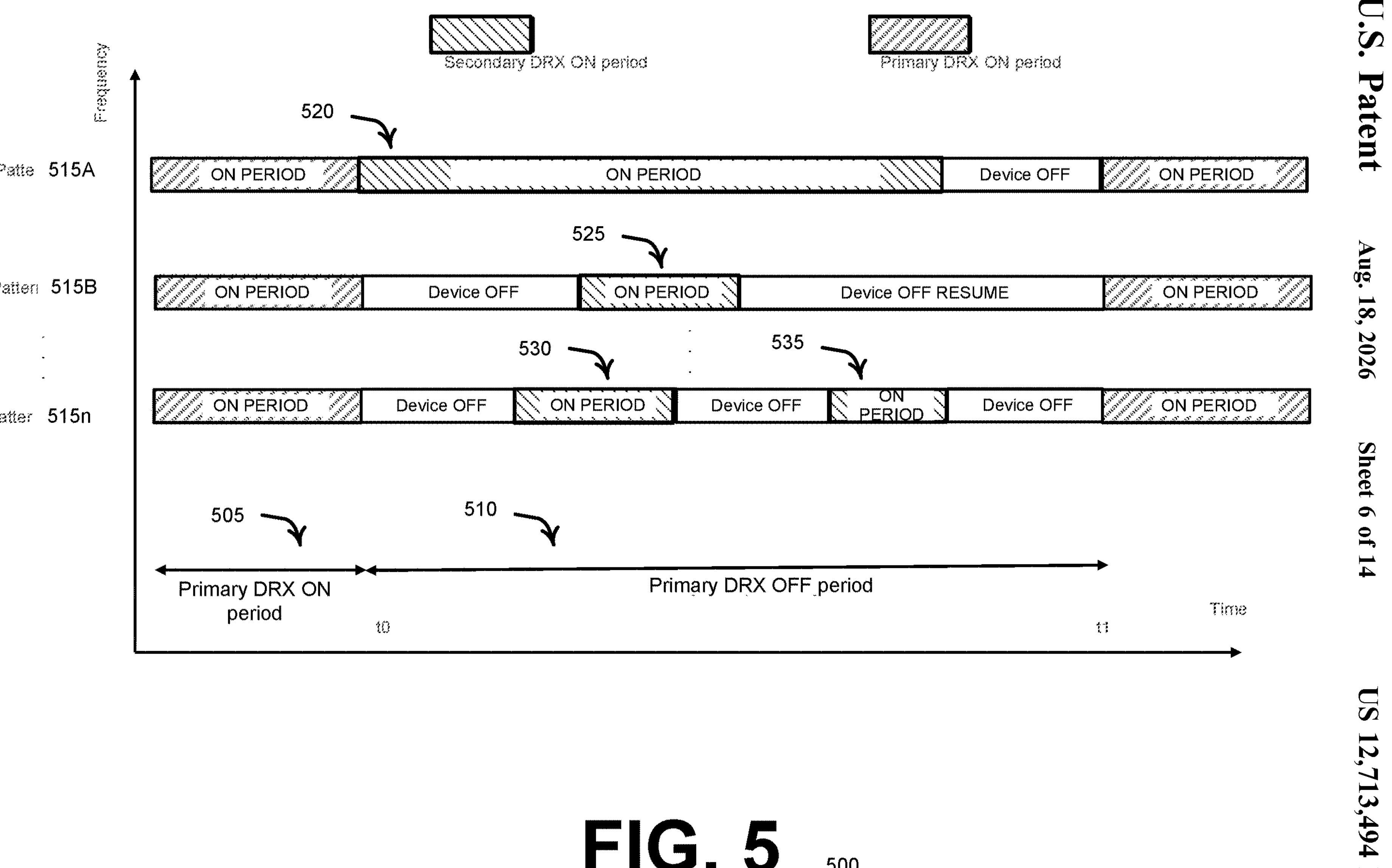
FIG. 5 illustrates example secondary discontinuous reception period patterns.

As shown by FIG. 5, examples of multiple secondary DRX ON patterns 515 are shown. Each of secondary DRX patterns 515 can be of various periodicity, have different DRX ON/active periods, or have different activation periods. Different patterns 515 may facilitate support for different traffic flows having different corresponding quality requirements. For example, for very latency-critical traffic flow arrivals, secondary DRX pattern 515A may be adopted to simply extend, by period 520, a period that a user equipment is awake during primary DRX ON period 505, such that switching delay of a user equipment switching from an awake state to a sleep state and back to an awake state to receive traffic during a disparate secondary DRX ON period is avoided. This may be beneficial if a RAN node started to receive latency-critical traffic near the end of the current device primary DRX ON occasion 505 and immediately extends the awake time of the user equipment by activating and scheduling DRX secondary pattern 515A, for example via a secondary reception occasion indication 430 described in reference to FIG. 4B. Pattern 515B shown in FIG. 5 may be indicated via an indication message 430 shown in FIG. 4B to facilitate transmission of traffic before a next configured primary DRX ON period (e.g., during configured primary DRX OFF period 510) if the sporadic traffic arrives near the end of primary DRX ON period 515 and indication 430 cannot be delivered from a radio access network node to a user equipment before the user equipment begins entering sleep mode corresponding to DRX OFF period 510. As shown in FIG. 5, secondary DRX ON reception occasion periods 520, and 525, corresponding to patterns 515A and 51B, respectively, and secondary DRX reception occasion periods 530 and 535 corresponding to pattern **515*n*, occur during primary DRX OFF period 510. Thus, implementation of patterns 515** may be used as a supplement to, instead of as a replacement of, a primary DRX ON/OFF cycle configuration.

Turning now to FIG. 6, the figure illustrates a reception occasion configuration 600 comprising secondary reception occasion configuration information. Configuration 600 may comprise primary discontinuous reception resource information, or primary discontinuous reception configuration information may be configured via configuration information received from a RAN via a configuration message separate from a message that comprises configuration 600. Information in configuration 600 may configure a user equipment with an available list or codebook of secondary DRX ON patterns, corresponding to example identifiers 652 and 656. Configuration 600 may associate timing and frequency information 654 and 658 with corresponding secondary DRX ON periods/patterns identified by indices/identifiers 652 and 656, respectively, which may define one or more patterns, for example patterns 515 shown in FIG. 5. Timing and frequency information 654 and 658 shown in FIG. 6 may comprise activation period information (e.g., a duration that the corresponding secondary period will be active, or in an ON state) for respective corresponding secondary DRX patterns identified by identifiers 652 and 656. A RAN node may transmit, for example, via an indication message 430 shown in FIG. 4B, to a user equipment a secondary DRX pattern index indication 652 or 654, for example, corresponding to secondary information 654 or 658, to dynamically activate a DRX pattern to be operated according to information 654 or 658 corresponding to identifiers 652 or 656, respectively. The RAN node may transmit to the user equipment the index or identifier 652 or 656 via a configured device-specific control channel, for example indication 430 described in reference to FIG. 4B, which may be transmitted to the user equipment via a control channel resource configured to be usable by the user equipment.

Figure 7:
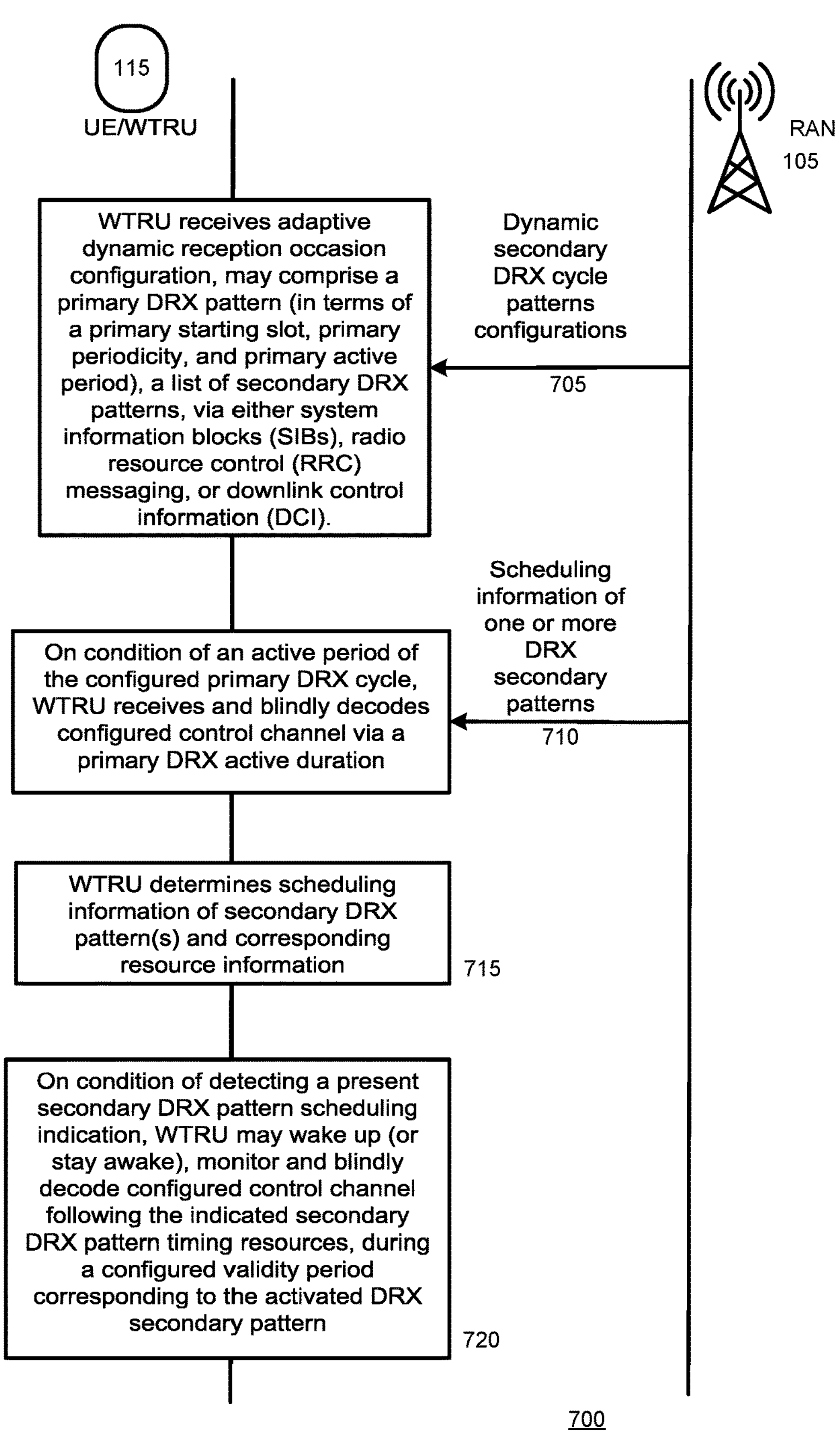
FIG. 7 illustrates a timing diagram of an example embodiment of using one or more secondary reception occasions, configured to occur during one or more primary discontinuous reception period(s), to receive traffic.

Turning now to FIG. 7, the figure illustrates a timing diagram of an example embodiment method 700 to configure a user equipment with one or more secondary reception occasions ON periods. At act 705, RAN 105 transmits and UE 115 receives, an adaptive dynamic reception configuration, such as configuration 600 shown in FIG. 6, which may comprise configuration information corresponding to primary discontinuous reception ON/OFF periods or which may comprise secondary reception occasion information corresponding to secondary reception occasions that may be configured to occur during one or more primary discontinuous reception OFF periods. An adaptive (e.g., which may be adapted by RAN 105 based on traffic the RAN may receive and that is directed to UE 115) secondary DRX configuration may comprise a list of secondary DRX patterns and may be transmitted by RAN 105 to UE 115 via system information blocks ("SIB"s), radio resource control ("RRC") signal messages, or downlink control information ("DCI") messages. During a primary DRX ON period of a configured primary DRX cycle, UE/WTRU 115 may receive and blindly decode at act 710 a configured control channel (e.g., that may be configured via configuration information other than configuration information received at act 705). From a secondary reception occasion indication, such as indication 430 described in reference to FIG. 4B, at act 715, shown in FIG. 7, UE/WTRU 115 may determine scheduling information corresponding to one or more secondary DRX patterns and associated resource information. At act 720, on condition of detecting a secondary DRX pattern scheduling indication, such as indication 430 described in reference to FIG. 4B, UE/WTRU 115 may wake up during a configured primary DRX OFF period, monitor, and blindly decode a configured control channel, or a data channel, according to a secondary DRX pattern timing resource indicated in a secondary reception occasion indication during a validity/active period corresponding to one of the activated DRX secondary pattern(s). It will be appreciated that if a secondary reception occasion period indicates a pattern that comprises a secondary reception occasion period that is an extension of a currently active primary DRX ON period, UE 115 may remain awake and receive traffic during the extended period at act 720 instead of waking up to receive the traffic.

Turning now to FIG. 8, the figure illustrates a flow diagram of an example embodiment 800. Method 800 begins at act 805. At act 810, a radio access network node transmits a discontinuous reception occasion configuration to a user equipment. The discontinuous reception occasion configuration may comprise configuration information corresponding to primary DRX ON and OFF periods. The discontinuous reception occasion configuration may comprise configuration information corresponding to secondary DRX ON and OFF periods. At act 815, the radio access network node may receive traffic directed to the user equipment. At act 820, the radio access network node may determine whether the traffic received at act 815 is associated with a low latency quality of service or whether the traffic is sporadic or bursty in nature. If the radio access network node determines at act 820 that traffic received at act 815 is periodic in nature, method 800 advances to act 830 and the radio access network node transmits the traffic received at act 815 during a configured primary discontinuous reception ON period. 'Periodic traffic' may refer to traffic, or packets of a traffic flow, that arrive(s) at the radio access network node at a regular periodicity, or at a regular rate. Traffic of a traffic flow comprising packets that arrive at radio access network node at a rate that, although not necessarily exactly periodic, statistically has an average or mean arrival rate at the radio access network node may also be referred to as period traffic.

Continuing with description of FIG. 8, at act 820, if the radio access network node determines at act 820 that the traffic received at act 815 is sporadic in nature or is associated with a low latency requirement, method 800 advances to act 825. At act 825, the radio access network node may determine whether the sporadic traffic received at act 815 can be transmitted to the user equipment and received by the user equipment during a currently active primary discontinuous reception ON period.

If a determination is made at act 825 that sporadic traffic received at act 815 can be transmitted and received during a currently active primary discontinuous reception ON period, method 800 advances to act 830. At act 830, the radio access network node may transmit traffic during a configured primary discontinuous reception ON period. The traffic transmitted at act 830 may comprise periodic traffic (e.g., traffic received having a statistically predictable average periodicity). The traffic transmitted at act 830 may comprise sporadic traffic that does not arrive at the radio access network node at a regular periodicity or at a statistically predictable average periodicity if the radio access network node determined at act 820 that the sporadic traffic can be successfully transmitted during a scheduled primary discontinuous reception ON period. At act 835, the user equipment may wake up according to a configured primary discontinuous reception on cycle, or if the user equipment is already awake for a configured primary discontinuous reception ON period, the user equipment may receive at act 835 the traffic transmitted at act 830. After receiving traffic at act 835, the user equipment may enter a sleep mode according to a configured primary discontinuous reception OFF period and method 800 advances to act 875 and ends.

Returning to description of act 825, if a determination is made that sporadic traffic received at act 815 cannot be transmitted to a user equipment and received thereby during a currently active primary discontinuous reception ON period, method 800 may advance to act 840. At act 840, the radio access network node may transmit to the user equipment a secondary reception occasion indication, such as indication 430 described in reference to FIG. 4B.

The secondary reception occasion indication may be transmitted in a control channel corresponding to the user equipment during a primary discontinuous reception ON period corresponding to the user equipment. The secondary reception occasion indication may be indicative of a secondary reception occasion ON period that the radio access network node has scheduled to occur during a previously configured primary discontinuous reception OFF period. In an embodiment, the secondary reception occasion ON period may extend a currently active primary discontinuous reception ON period such that the user equipment, operating according to the indicated secondary reception occasion ON period, does not turn off a receiver radio chain and turn the receiver radio chain back on again to receive traffic during the indicated secondary reception occasion ON period. In an embodiment, an indicated secondary reception occasion ON period may be scheduled by the radio access network node to occur during a primary discontinuous reception OFF period after the user equipment has already turned off a radio receiver chain. In an embodiment, the secondary reception occasion indication may comprise timing resource information or frequency resource information usable by the user equipment to receive traffic during the indicated secondary reception occasion ON period. In an embodiment, the secondary reception occasion indication may comprise an index, or an identifier, indicative of timing resource information or frequency resource information corresponding to the same index or identifier in the configuration information transmitted to the user equipment at act 810 shown in FIG. 8. By transmitting an index or an identifier indicative of timing or frequency resource information instead of transmitting actual frequency and timing resource information to the user equipment the secondary reception occasion indication they comprise fewer bits than if actual timing and frequency resource information were transmitted via the secondary reception occasion indication. The secondary reception occasion indication may be indicative of a secondary reception occasion pattern. The secondary reception occasion pattern may be one of at least one secondary reception occasion pattern configured via configuration information transmitted to the user equipment at act 810.

Continuing with description of FIG. 8, at act 845, the user equipment may wake up according to a configured primary discontinuous reception configuration ON period, or the user equipment may remain awake if the user equipment is currently operating a radio receiver chain according to a primary discontinuous reception ON period. At act 850, the user equipment may receive periodic traffic, or statistically predictable traffic. At act 855, the user equipment may detect and decode a secondary reception occasion indication (e.g., indication 430 shown in FIG. 4B) that may have been transmitted by the radio access network node at act 840. At act 860, if the user equipment has already shut down a radio receiver chain after detecting and decoding the secondary reception occasion indication at act 855, the user equipment may wake up. If the user equipment is still awake during a primary this continuous reception ON period after detecting and decoding the secondary reception occasion indication at act 855, the user equipment may remain in an awake state, or ON state, at act 860 according to a secondary reception occasion ON period indicated by the indication transmitted at act 840. At act 865, the radio access network may transmit, and the user equipment may receive, sporadic traffic packets that the radio access network node may have received at act 815. After receiving sporadic traffic packets at act 865, the user equipment may shut down a radio receiver chain at act 870. Method 800 advances to act 875 and ends.

Turning now to FIG. 9, the figure illustrates an example embodiment method 900 comprising at block 905 transmitting, by a radio access network node comprising a processor to a user equipment, at least one secondary reception occasion indication indicative of a secondary reception period during which the user equipment is to be capable of receiving traffic from the radio access network node, wherein the at least one secondary reception occasion indication is transmitted during a configured primary reception period during which the user equipment is to be capable of receiving traffic from the radio access network node; at block 910 transmitting, by the radio access network node to the user equipment, traffic during the secondary reception period; at block 915 determining, by the radio access network node, a traffic characteristic parameter metric corresponding to the traffic; at block 920 analyzing, by the radio access network node, the traffic characteristic parameter metric according to a function to result in an analyzed characteristic parameter metric; and at block 925 determining, by the radio access network node, to transmit the at least one secondary reception occasion indication based on the analyzed characteristic parameter metric.

Turning now to FIG. 10, the figure illustrates an example radio access network node, comprising at block 1005 a processor configured to transmit, to a user equipment, a secondary reception occasion configuration comprising at least one secondary reception occasion pattern and at least one secondary reception occasion pattern index associated with the at least one secondary reception occasion pattern; a block 1010 transmit, to the user equipment, at least one of the at least one secondary reception occasion pattern index indicative of at least one of the at least one secondary reception occasion pattern comprising at least one secondary reception period during which the user equipment is to be capable of receiving traffic from the radio access network node, wherein the at least one secondary reception occasion pattern index is transmitted during a configured primary reception period during which the user equipment is to be capable of receiving the traffic from the radio access network node; at block 1015 transmit, to the user equipment, the traffic during the at least one secondary reception period; and at block 1020 The radio access network node of claim 14, wherein the at least one secondary reception period occurs during a primary discontinuous reception OFF period that was configured by the radio access network node before the transmitting of the at least one secondary reception occasion pattern index.

Figure 11:
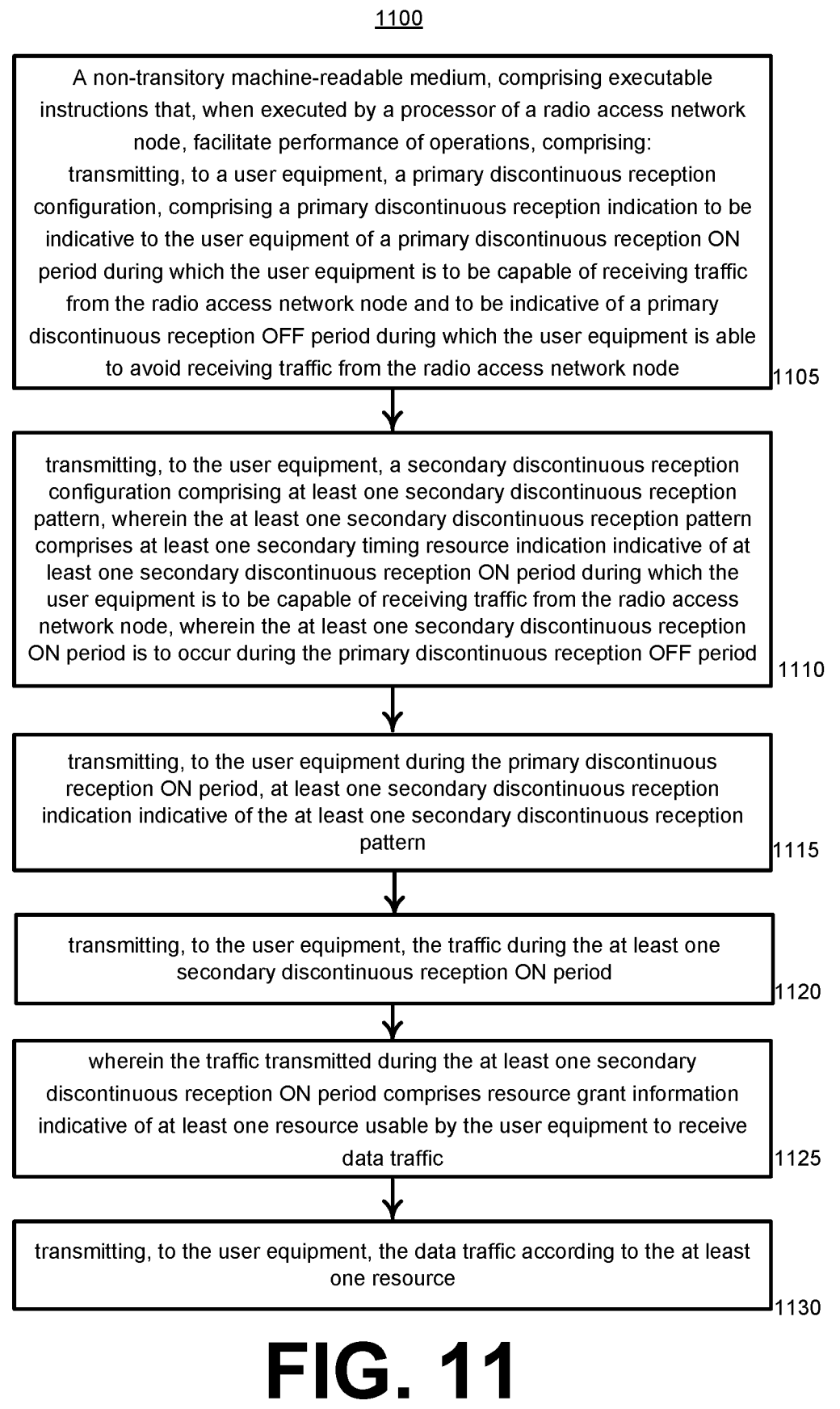

Turning now to FIG. 11, the figure illustrates a non-transitory machine-readable medium 1100 comprising at block 1105 executable instructions that, when executed by a processor of a radio access network node, facilitate performance of operations, comprising transmitting, to a user equipment, a primary discontinuous reception configuration, comprising a primary discontinuous reception indication to be indicative to the user equipment of a primary discontinuous reception ON period during which the user equipment is to be capable of receiving traffic from the radio access network node and to be indicative of a primary discontinuous reception OFF period during which the user equipment is able to avoid receiving traffic from the radio access network node; at block 1110 transmitting, to the user equipment, a secondary discontinuous reception configuration comprising at least one secondary discontinuous reception pattern, wherein the at least one secondary discontinuous reception pattern comprises at least one secondary timing resource indication indicative of at least one secondary discontinuous reception ON period during which the user equipment is to be capable of receiving traffic from the radio access network node, wherein the at least one secondary discontinuous reception ON period is to occur during the primary discontinuous reception OFF period; at block 1115 transmitting, to the user equipment during the primary discontinuous reception ON period, at least one secondary discontinuous reception indication indicative of the at least one secondary discontinuous reception pattern; at block 1120 transmitting, to the user equipment, the traffic during the at least one secondary discontinuous reception ON period; at block 1125 wherein the traffic transmitted during the at least one secondary discontinuous reception ON period comprises resource grant information indicative of at least one resource usable by the user equipment to receive data traffic; and at block 1130 transmitting, to the user equipment, the data traffic according to the at least one resource.

Figure 12:
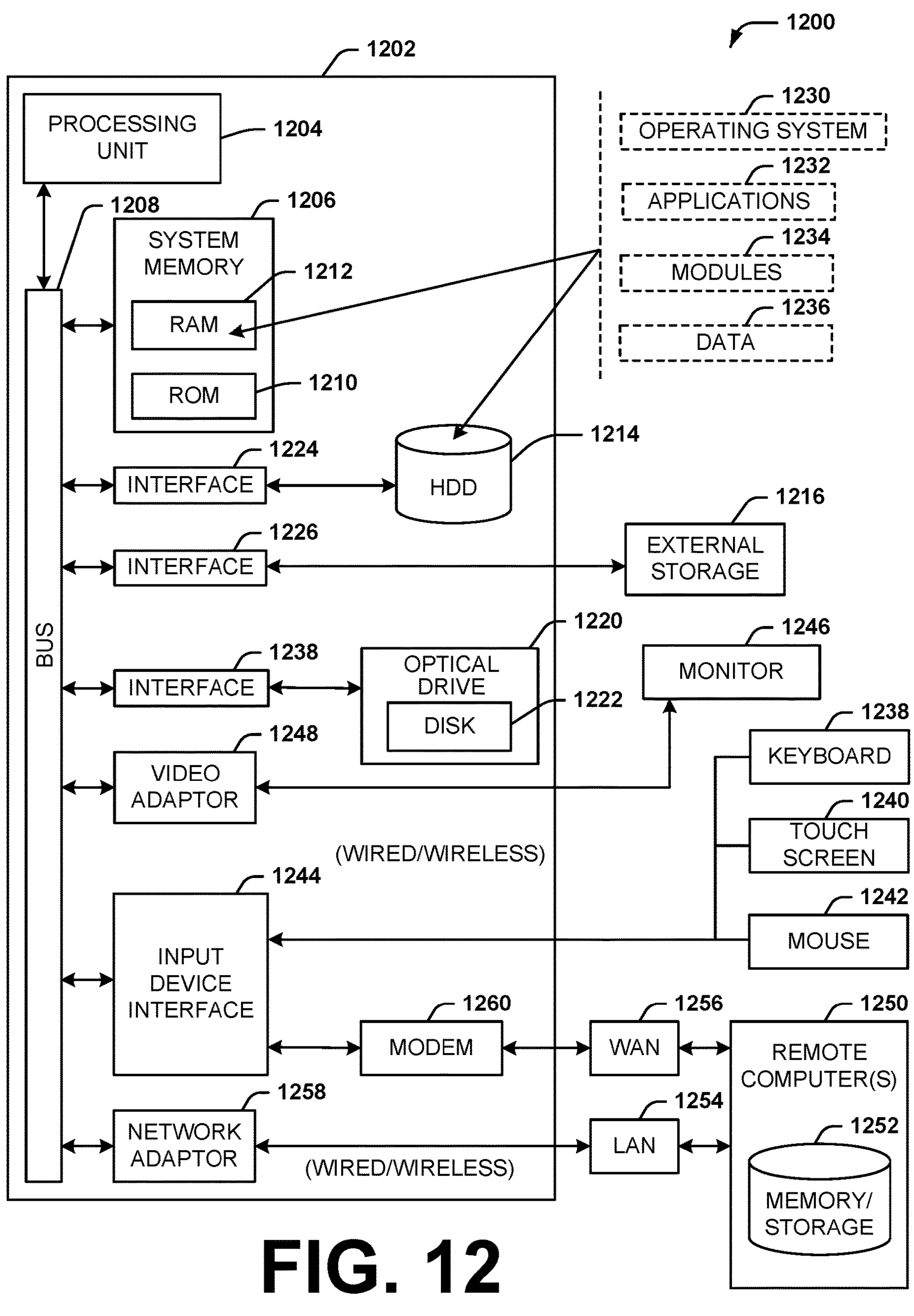
FIG. 12 illustrates an example computer environment.

In order to provide additional context for various embodiments described herein, FIG. 12 and the following discussion are intended to provide a brief, general description of a suitable computing environment 1200 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors and may include a cache memory. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

Computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid-state drive (SSD) could be used in addition to, or in place of, an HDD 1210. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can comprise a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 13:
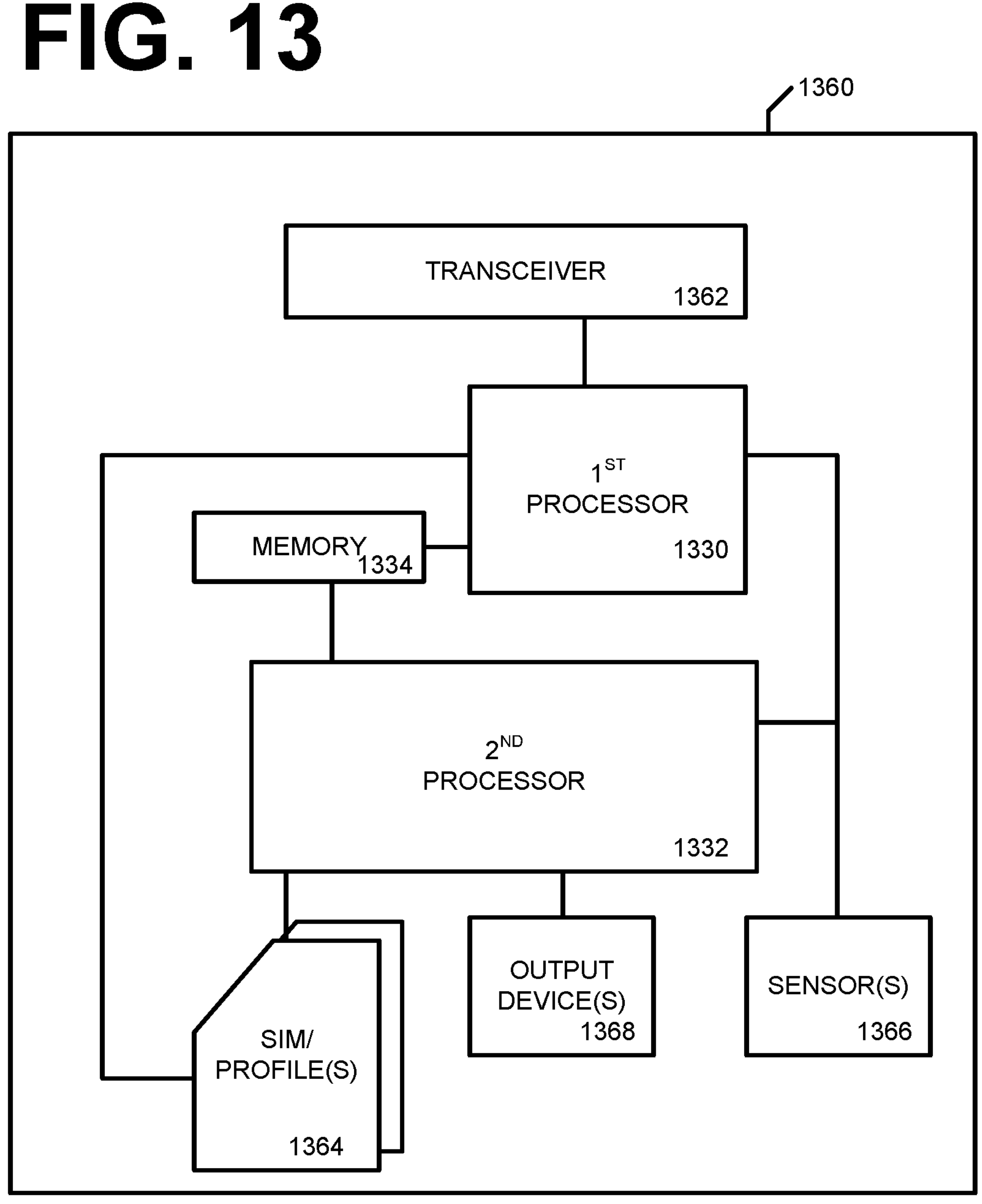
FIG. 13 illustrates a block diagram of an example wireless user equipment.

Turning now to FIG. 13, the figure illustrates a block diagram of an example UE 1360. UE 1360 may comprise a smart phone, a wireless tablet, a laptop computer with wireless capability, a wearable device, a machine device that may facilitate vehicle telematics, and the like. UE 1360 comprises a first processor 1330, a second processor 1332, and a shared memory 1334. UE 1360 includes radio front end circuitry 1362, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1362 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 13, UE 1360 may also include a SIM 1364, or a SIM profile, which may comprise information stored in a memory (memory 34 or a separate memory portion), for facilitating wireless communication with RAN 105 or core network 130 shown in FIG. 1. FIG. 13 shows SIM 1364 as a single component in the shape of a conventional SIM card, but it will be appreciated that SIM 1364 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1364 and another device, which may be a component of RAN 105 or core network 130 shown in FIG. 1). A SIM profile 1364 may also comprise identifying information that is unique to the SIM, or SIM profile, such as, for example, an International Mobile Subscriber Identity ("IMSI") or information that may make up an IMSI.

SIM 1364 is shown coupled to both the first processor portion 1330 and the second processor portion 1332. Such an implementation may provide an advantage that first processor portion 30 may not need to request or receive information or data from SIM 1364 that second processor 1332 may request, thus eliminating the use of the first processor acting as a 'go-between' when the second processor uses information from the SIM in performing its functions and in executing applications. First processor 1330, which may be a modem processor or baseband processor, is shown smaller than processor 1332, which may be a more sophisticated application processor, to visually indicate the relative levels of sophistication (i.e., processing capability and performance) and corresponding relative levels of operating power consumption levels between the two processor portions. Keeping the second processor portion 1332 asleep/inactive/in a low power state when UE 1360 does not need it for executing applications and processing data related to an application provides an advantage of reducing power consumption when the UE only needs to use the first processor portion 1330 while in listening mode for monitoring routine configured bearer management and mobility management/maintenance procedures, or for monitoring search spaces that the UE has been configured to monitor while the second processor portion remains inactive/asleep.

UE 1360 may also include sensors 1366, such as, for example, temperature sensors, accelerometers, gyroscopes, barometers, moisture sensors, and the like that may provide signals to the first processor 1330 or second processor 1332. Output devices 1368 may comprise, for example, one or more visual displays (e.g., computer monitors, VR appliances, and the like), acoustic transducers, such as speakers or microphones, vibration components, and the like. Output devices 1368 may comprise software that interfaces with output devices, for example, visual displays, speakers, microphones, touch sensation devices, smell or taste devices, and the like, that are external to UE 1360.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| QoS | Quality of service |
| DRX | Discontinuous reception |
| DTX | Discontinuous transmission |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID |
| BWP | Bandwidth Part |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

transmitting, by a radio access network node comprising at least one processor to a user equipment, at least one secondary reception occasion indication comprising a secondary reception occasion configuration according to which the user equipment is to be capable of receiving traffic from the radio access network node, wherein the at least one secondary reception occasion indication is transmitted during a configured primary reception period during which the user equipment is to be capable of receiving traffic from the radio access network node; and transmitting, by the radio access network node to the user equipment, traffic during the secondary reception period, wherein the at least one secondary reception occasion indication is indicative of the secondary reception period occurring during a primary discontinuous reception OFF period corresponding to a primary discontinuous reception configuration that was configured by the radio access network node before the transmitting of the at least one secondary reception occasion indication, and wherein the at least one secondary reception occasion indication is to be indicative to the user equipment that the user equipment is to revert to operation according to the primary discontinuous reception configuration after receiving the traffic transmitted during the secondary reception period.

2. The method of claim 1, wherein the configured primary reception period is a primary discontinuous reception ON period configured by the radio access network node before the transmitting of the at least one secondary reception occasion indication.

3. The method of claim 1, wherein the at least one secondary reception occasion indication is transmitted as a control channel information message.

4. The method of claim 1, further comprising:

determining, by the radio access network node, a traffic characteristic parameter metric corresponding to the traffic;

analyzing, by the radio access network node, the traffic characteristic parameter metric according to a function to result in an analyzed characteristic parameter metric; and determining, by the radio access network node, to transmit the at least one secondary reception occasion indication based on the analyzed characteristic parameter metric.

5. The method of claim 4, wherein the traffic characteristic parameter metric corresponds to a traffic characteristic that comprises at least one of: a latency characteristic, a reliability characteristic, a periodicity characteristic.

6. The method of claim 1, wherein the secondary reception occasion configuration comprises a secondary reception occasion pattern and a secondary reception occasion pattern index associated with the secondary reception occasion pattern, and wherein the at least one secondary reception occasion indication comprises the secondary reception occasion pattern index, which is to be indicative to the user equipment to operate according to the secondary reception occasion pattern.

7. The method of claim 1, further comprising:

wherein the secondary reception occasion configuration comprises a first secondary reception occasion pattern associated with a first secondary reception occasion pattern index and comprises a second secondary reception occasion pattern associated with a second secondary reception occasion pattern index, and wherein the at least one secondary reception occasion indication comprises at least one of the first secondary reception occasion pattern index or the second secondary reception occasion pattern index.

8. The method of claim 7, wherein the traffic comprises a first traffic flow and a second traffic flow, wherein the secondary reception occasion configuration further comprises a first secondary reception occasion criterion associated with the first secondary reception occasion pattern index, and wherein the secondary reception occasion configuration further comprises a second secondary reception occasion criterion associated with the second secondary reception occasion pattern index, the method further comprising:

determining, by the radio access network node, a first traffic characteristic parameter metric corresponding to the first traffic flow;

analyzing, by the radio access network node, the first traffic characteristic parameter metric according to a first function to result in an analyzed first traffic characteristic parameter metric; and transmitting, by the radio access network node to the user equipment, the first secondary reception occasion pattern index based on the analyzed first traffic characteristic parameter metric being determined to satisfy the first secondary reception occasion criterion, wherein the transmitting of the traffic during the secondary reception period comprises transmitting traffic corresponding to the first traffic flow according to the first secondary reception occasion pattern.

9. The method of claim 8, further comprising:

determining, by the radio access network node, a second traffic characteristic parameter metric corresponding to the second traffic flow;

analyzing, by the radio access network node, the second traffic characteristic parameter metric according to a second function to result in an analyzed second traffic characteristic parameter metric; and transmitting, by the radio access network node to the user equipment, the second secondary reception occasion pattern index based on the analyzed second traffic characteristic parameter metric being determined to satisfy the second secondary reception occasion criterion, wherein the transmitting of the traffic during the secondary reception period comprises transmitting traffic corresponding to the second traffic flow according to the second secondary reception occasion pattern.

10. The method of claim 9, wherein the first traffic flow and the second traffic flow correspond to a first application associated with an extended reality appliance and a second application associated with the extended reality appliance, respectively.

11. The method of claim 1, wherein the secondary reception period is longer than a switching-on delay corresponding to the user equipment.

12. A radio access network node, comprising:

at least one processor configured to:

transmit, to a user equipment, a secondary reception occasion configuration comprising at least one secondary reception occasion pattern and at least one secondary reception occasion pattern index associated with the at least one secondary reception occasion pattern;

transmit, to the user equipment, at least one of the at least one secondary reception occasion pattern index indicative of at least one of the at least one secondary reception occasion pattern comprising at least one secondary reception period during which the user equipment is to be capable of receiving traffic from the radio access network node, wherein the at least one secondary reception occasion pattern index is transmitted during a configured primary reception period during which the user equipment is to be capable of receiving the traffic from the radio access network node; and transmit, to the user equipment, the traffic during the at least one secondary reception period, wherein the at least one secondary reception pattern occasion index is transmitted via at least one secondary reception occasion indication, and wherein the at least one secondary reception occasion indication is to be indicative to the user equipment that the user equipment is to revert to operation according to a primary discontinuous reception configuration after receiving the traffic transmitted during the secondary reception period.

13. The radio access network node of claim 12, wherein the at least one secondary reception period occurs during a primary discontinuous reception OFF period that was configured by the radio access network node before the transmitting of the at least one secondary reception occasion pattern index.

14. The radio access network node of claim 12, wherein the traffic comprises a first traffic flow and a second traffic flow, wherein the at least one secondary reception occasion pattern is a first secondary reception occasion pattern comprising a first of the at least one secondary reception period, wherein the at least one secondary reception occasion pattern index is a first secondary reception occasion pattern index, wherein the secondary reception occasion configuration further comprises a first secondary reception occasion criterion associated with the first secondary reception occasion pattern index, wherein the secondary reception occasion configuration further comprises a second of the at least one secondary reception occasion pattern index and a second of the at least one secondary reception occasion pattern that comprises a second of the at least one secondary reception period, and wherein the secondary reception occasion configuration further comprises a second secondary reception occasion criterion associated with the second secondary reception occasion pattern index, the processor further configured to:

determine a first traffic characteristic parameter metric corresponding to the first traffic flow;

determine a second traffic characteristic parameter metric corresponding to the second traffic flow;

analyze the first traffic characteristic parameter metric according to a first function to result in an analyzed first traffic characteristic parameter metric;

analyze the second traffic characteristic parameter metric according to a second function to result in an analyzed second traffic characteristic parameter metric; and determine to transmit the first of the at least one secondary reception occasion pattern index based on the analyzed first traffic characteristic parameter metric satisfying the first secondary reception occasion criterion and based on the analyzed second traffic characteristic parameter metric satisfying the first secondary reception occasion criterion, wherein the transmitting of the traffic during the secondary reception period comprises transmitting traffic, corresponding to the first traffic flow and corresponding to the second traffic flow, according to the first of the at least one secondary reception occasion pattern.

15. The radio access network node of claim 14, wherein the first function and the second function are the same.

16. The radio access network node of claim 12, wherein the secondary reception period is longer than a switching-on delay corresponding to the user equipment.

17. A non-transitory machine-readable medium, comprising executable instructions that, when executed by at least one processor of a radio access network node, facilitate performance of operations, comprising:

transmitting, to a user equipment, a primary discontinuous reception configuration, comprising a primary discontinuous reception indication to be indicative to the user equipment of a primary discontinuous reception ON period during which the user equipment is to be capable of receiving traffic from the radio access network node and to be indicative of a primary discontinuous reception OFF period during which the user equipment is able to avoid receiving traffic from the radio access network node;

transmitting, to the user equipment, a secondary discontinuous reception configuration comprising at least one secondary discontinuous reception pattern, wherein the at least one secondary discontinuous reception pattern comprises at least one secondary timing resource indication indicative of at least one secondary discontinuous reception ON period during which the user equipment is to be capable of receiving traffic from the radio access network node, wherein the at least one secondary discontinuous reception ON period is to occur during the primary discontinuous reception OFF period, wherein the secondary discontinuous reception configuration is transmitted to the user equipment during the primary discontinuous reception ON period; and transmitting, to the user equipment, the traffic during the at least one secondary discontinuous reception ON period.

18. The non-transitory machine-readable medium of claim 17, wherein the traffic transmitted during the at least one secondary discontinuous reception ON period comprises resource grant information indicative of at least one resource usable by the user equipment to receive data traffic.

19. The non-transitory machine-readable medium of claim 18, the operations further comprising:

transmitting, to the user equipment, the data traffic according to the at least one resource.

20. The non-transitory machine-readable medium of claim 17, wherein at least one of the at least one secondary discontinuous reception ON period is longer than a switching-on delay corresponding to the user equipment.

* * * * *